US008666723B2

(12) United States Patent
Xie et al.

(10) Patent No.: US 8,666,723 B2
(45) Date of Patent: Mar. 4, 2014

(54) SYSTEM AND METHODS FOR GENERATING AND MANAGING A VIRTUAL DEVICE

(75) Inventors: Fei Xie, Portland, OR (US); Kai Cong, Portland, OR (US); Li Lei, Portland, OR (US)

(73) Assignee: Oregon State Board of Higher Education on behalf of Portland State University, Portland, OR (US)

( * ) Notice: Subject to any disclaimer, the term of this patent is extended or adjusted under 35 U.S.C. 154(b) by 0 days.

(21) Appl. No.: 13/601,425

(22) Filed: Aug. 31, 2012

(65) Prior Publication Data

US 2013/0085720 A1    Apr. 4, 2013

Related U.S. Application Data

(60) Provisional application No. 61/529,545, filed on Aug. 31, 2011.

(51) Int. Cl.
*G06F 17/50* (2006.01)
*G06F 9/44* (2006.01)
*G06F 13/10* (2006.01)
*G06F 13/12* (2006.01)

(52) U.S. Cl.
USPC .................... 703/14; 703/13; 703/20; 703/21

(58) Field of Classification Search
None
See application file for complete search history.

(56) References Cited

U.S. PATENT DOCUMENTS

| | | | |
|---|---|---|---|
| 6,353,806 B1 * | 3/2002 | Gehlot | ............................ 703/21 |
| 7,840,790 B1 | 11/2010 | Sekhar et al. | |
| 7,941,813 B1 | 5/2011 | Protassov et al. | |
| 2007/0074226 A1 | 3/2007 | Zimmer et al. | |
| 2009/0113422 A1 | 4/2009 | Kani | |

FOREIGN PATENT DOCUMENTS

WO    2011072340 A1    6/2011

OTHER PUBLICATIONS

Baluda, M. et al., "Structural coverage of feasible code," 5th International Workshop on Automation of Software Test, May 3, 2010, pp. 59-66.
Barham, P. et al., "Xen and the Art of Virtualization," ACM Symposium on Operating Systems Principles, Oct. 19, 2003. pp. 164-177.
QEMU: Open Source Processor Emulator, Main Page, http://wiki.qemu.org/Main_Page, 2012.
Bellard, F., "QEMU, a Fast and Portable Dynamic Translator," FREENIX Track: USENIX Annual Technical Conference, Apr. 10, 2005, pp. 41-46.
Bethea, D. et al., "Server-Side Verification of Client Behavior in Online Games," ACM Transactions on Information and Systems Security, Dec. 2011, 27 pages, vol. 14, No. 4.

(Continued)

*Primary Examiner* — Saif Alhija
(74) *Attorney, Agent, or Firm* — Schwabe Williamson & Wyatt

(57) ABSTRACT

Certain embodiments of the present invention are configured to permit development and validation of a device driver or a device application program by using improved virtual devices. Such improved virtual devices facilitate driver development without use of real devices or hardware prototypes. The present invention also may be configured to permit advanced validation of a device-driver combination that would be difficult to achieve even with a real device. Certain embodiments also may detect inconsistencies between virtual and real devices, which may be used to improve drivers and device application programs and increase compatibility of such drivers and device application programs with real devices.

20 Claims, 12 Drawing Sheets

(56) References Cited

OTHER PUBLICATIONS

Cadar, C. et al., "RWset: Attacking Path Explosion in Constraint-Based Test Generation," Tools and Algorithms for the Construction and Analysis of Systems, 14th International Conference, Mar. 29, 2008, 49 pages.

Boonstoppel, P. et al., "RWset: Attacking Path Explosion in Constraint-Based Test Generation," Tools and Algorithms for the Construction and Analysis of Systems, 14th International Conference, Mar. 29, 2008, 16 pages.

Boule, M. et al., "Adding Debug Enhancements to Assertion Checkers for Hardware Emulation and Silicon Debug," International Conference on Computer Design, Oct. 1, 2006, pp. 294-299.

Brumley, D., "Towards Automatic Generation of Vulnerability-Based Signatures," Proceedings of the 2006 IEEE Symposium on Security and Privacy, May 1, 2006, 15 pages.

Cadar, C., "EXE: Automatically Generating Inputs of Death," 13th ACM Conference on Computer and Communications Security, Oct. 30, 2006, pp. 322-335.

Cadar, C., "Execution Generated Test Cases: How to Make Systems Code Crash Itself," International Workshop on Model Checking of Software, 2005, 14 pages.

Chipounov, V. et al., "In-Vivo Multi-Path Analysis of Software Systems," Sixteenth International Conference on Architectural Support for Programming Languages and Operating Systems, Mar. 5, 2011, pp. 265-278.

Chou, A. et al., "An Empirical Study of Operating Systems Errors," Operating Systems Review—SIGOPS, 2001, pp. 73-88, vol. 35, No. 5.

Costa, M. et al., "Bouncer: Securing Software by Blocking Bad Input," 21st ACM Symposium on Operating Systems Principles, Oct. 14, 2007, 14 pages.

Costa, M. et al., "Vigilante: End-to-End Containment of Internet Worms," 20th ACM Symposium on Operating Systems Principles, Oct. 23, 2005, 15 pages.

De Paula, F. et al., "BackSpace: Formal Analysis for Post-Silicon Debug," Proceedings of the 2008 International Conference on Formal Methods in Computer-Aided Design, Nov. 17, 2008, pp. 1-10.

Emmi, M. et al., "Dynamic Test Input Generation for Database Applications," International Symposium on Software Testing and Analysis, 2007, pp. 151-162.

Ganesh, V. et al., "A Decision for Bit-Vectors and Arrays," 19th International Conference on Computer Aided Verification, Jul. 3, 2007, pp. 524-536.

Godefroid, P. et al., "Automated Whitebox Fuzz Testing," Network Distributed Security Symposium, Internet Society, 2008, 25 pages.

Godefroid, P. et al., "Automated Whitebox Fuzz Testing," Network and Distributed System Security Symposium, 2008, 13 pages.

Godefroid, P., "Compositional Dynamic Test Generation," ACM SIGPLAN-SIGACT Symposium on Principles of Programming Languages, Jan. 7, 2007, pp. 47-54.

Godefroid, P. et al., "DART: Directed Automated Random Testing," ACM SIGPLAN Conference on Programming Language Design and Implementation, Jun. 12, 2005, pp. 213-223.

Hao, K. et al., "Componentizing Hardware/Software Interface Design," Design Automation Test in Europe Conference Exhibition, Apr. 20, 2009, 6 pages.

Hao, K. et al., "Optimizing Equivalence Checking for Behavioral Synthesis," Proceedings of the Conference on Design, Automation and Test in Europe, Mar. 8, 2010, pp. 1500-1505.

Hu, A. et al., "Efficient Generation of Monitor Circuits for GSTE Assertion Graphs," International Conference on Computer-Aided Design, Nov. 11, 2003, pp. 154-159.

Jungo, USB Market Overview, 2011, 4 pages.

Kadav, A. et al., "Tolerating Hardware Device Failures in Software," 22nd ACM Symposium on Operating Systems Principles, Oct. 11, 2009, pp. 59-71.

King, J., "Symbolic Execution and Program Testing," Communications of the ACM, Jul. 1976, pp. 385-394, vol. 19, No. 7.

Kurshan, R. et al., "Combining Software and Hardware Verification Techniques," Formal Methods in System Design, 2002, pp. 251-280, vol. 21.

Kuznetsov, V. et al., "Testing Closed-Source Binary Device Drivers with DDT," Proceedings of the USENIX Annual Technical Conference, Jun. 2010, pp. 1-14.

Lattner, C. et al., "LLVM: A Compilation Framework for Lifelong Program Analysis & Transformation," Proceedings of the International Symposium on Code Generation and Optimization, 2004, 12 pages.

Li, J. et al., "Component-Based Abstraction and Refinement," International Conference on Software Reuse, May 25, 2008, pp. 39-51.

Li, J. et al., "Embedded Architecture Description Language," Annual IEEE International Computer Software and Applications Conference, 2008, pp. 36-43.

Li, J. et al., "Formalizing Hardware/Software Interface Specifications," 26th IEEE/ACM International Conference on Automated Software Engineering, Nov. 6, 2011, pp. 143-152.

Li, J. et al., "Guiding Component-Based Hardware/Software Co-Verification with Patterns," 33rd EUROMICRO Conference on Software Engineering and Advanced Applications, 2007, 8 pages.

Mentor Graphics, ModelSim Advance Simulation and Debugging, 2012.

Monniaux, D., "Verification of Device Drivers and Intelligent Controllers: a Case Study," ACM Conference on Embedded Systems Software, Oct. 1, 2007, 7 pages.

Murphy, B. et al., "Software Reliability Engineering for Mass Market Products," Journal of Software Technology, Dec. 2004, 5 pages, vol. 8, No. 1.

Nacif, J. et al., "The Chip is Ready. Am I done? On-chip Verification using Assertion Processors," International Conference on Very Large Scale Integration of System-on-Chip, Dec. 1, 2003, 6 pages.

Nelson, S. et al., "Virtualization: Writing (and testing) device drivers without hardware," Linux Plumbers Conference, Sep. 7, 2011, 32 pages.

Opencores, Open Source Hardware IP, 2012, 2 pages.

Virtualbox, Welcome to VirtualBox.org, 2012, 1 page.

PCI, Conventional PCI 3.0 & 2.3: An Evolution of the Conventional PCI Local Bus Specification, 2012, 2 pages.

Portland State University, TableSAT, 2010, 2 pages.

Ray, S. et al., "Connecting Pre-silicon and Post-silicon Verification," Formal Methods in Computer-Aided Design, 2009, pp. 160-163.

Ray, S. et al., "Formal Verification for High-Assurance Behavioral Synthesis," 7th International Symposium on Automated Technology for Verification and Analysis, Oct. 13, 2009, pp. 337-351.

Saturday Academy, Season of Giving, 2012, 2 pages.

Schwoon, S., "Model-Checking Pushdown Systems," Dissertation, Lehrstuhl fur Informatik VII der Technischen Universitat Munchen, 2002, 212 pages.

Sen, K. et al., "CUTE: A Concolic Unit Testing Engine for C," Joint Meeting of the European Software Engineering Conference and the ACM SIGSOFT Symposium on the Foundations of Software Engineering, Sep. 5, 2005, pp. 263-272.

Swift, M. et al., "Improving the Reliability of Commodity Operating Systems," 19th ACM Symposium on Operating Systems Principles, Oct. 19, 2003, pp. 207-222.

Snyder, W., "Introduction to Verilator," 2012, 1 page.

Vess, M., "System Modeling and Controller Design for a Single Degree of Freedom Spacecraft Simulator," Thesis, University of Maryland, 2005, 306 pages.

Visser, W. et al., "Test Input Generation with Java PathFinder," International Symposium on Software Testing and Analysis, Jul. 11, 2004, pp. 97-107.

VMWARE, "The Benefits of Virtualization for Small and Medium Businesses," White Paper, 2009, 11 pages.

VMWARE, "Virtualize Your IT Infrastructure," 2012, 4 pages.

Watson, J., "VirtualBox: Bits and Bytes Masquerading as Machines," Linux Journal, Feb. 1, 2008, 11 pages.

(56) References Cited

OTHER PUBLICATIONS

Xen, "What is Xen," Xen.org, 2011, 4 pages.
Xie, F. et al., "Component-Based Hardware/Software Co-Verification," Fourth ACM and IEEE International Conference on Formal Methods and Models for Co-Design, Jul. 27, 2006, pp. 27-36.
Xie, F. et al., "Compositional Reasoning for Hardware/Software Co-Verification," 4th International Symposium of Automated Technology for Verification and Analysis, Oct. 23, 2006, pp. 154-169.
Xie, F. et al., "Unified Property Specification for Hardware/Software Co-Verification," 31st Annual International Computer Software and Applications Conference, 2007, 8 pages.

* cited by examiner

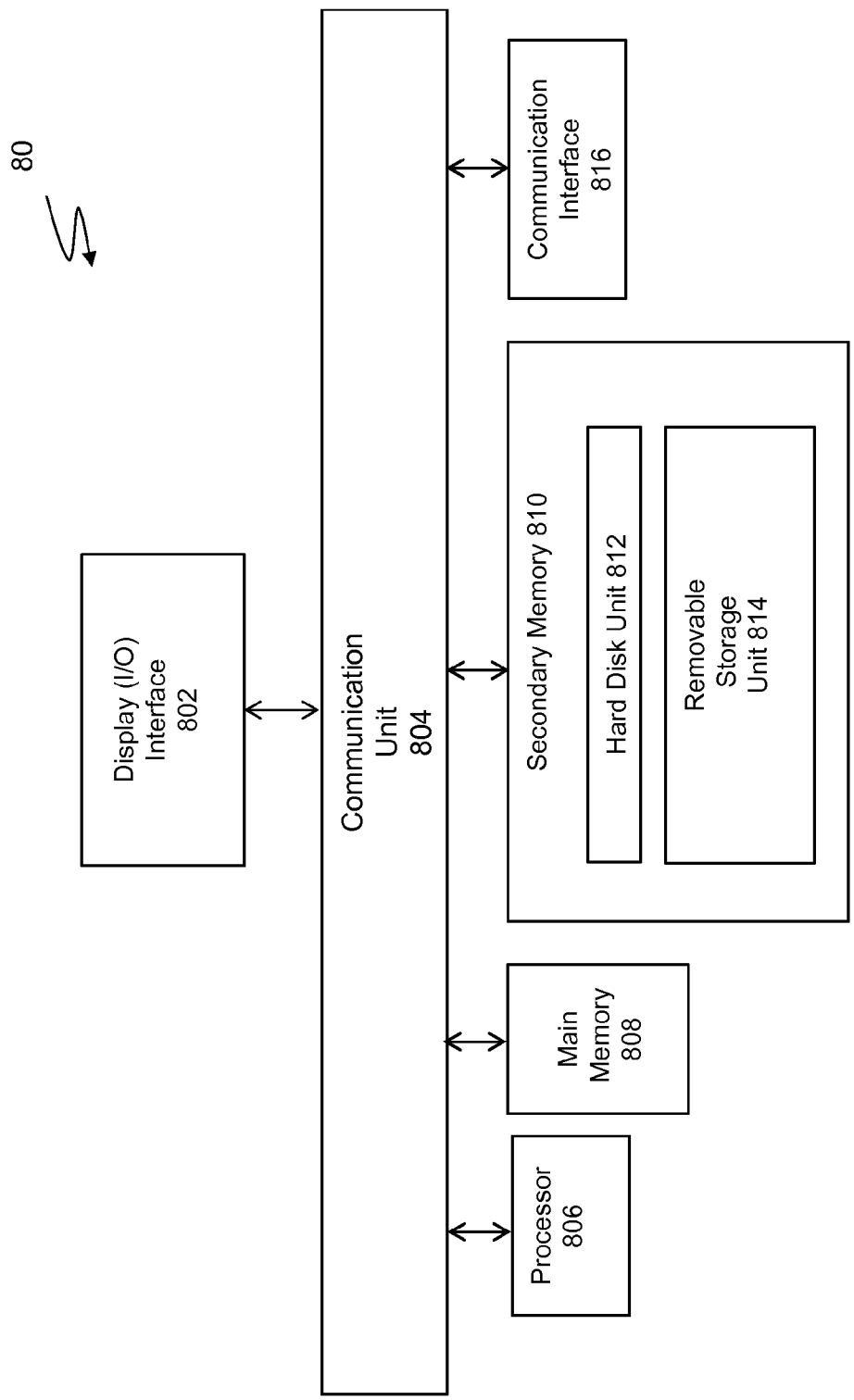

SYSTEM AND METHODS FOR GENERATING AND MANAGING A VIRTUAL DEVICE

This application claims the benefit of U.S. Provisional Application No. 61/529,545 filed Aug. 31, 2011.

GOVERNMENT FUNDING

The invention was made with government support under grants 0720546 and 0916968 awarded by the National Science Foundation. The United States Government has certain rights in the invention.

FIELD OF THE INVENTION

The present invention generally relates to computer systems. More specifically, the present invention relates to computer programs called "device drivers" that facilitate communication between hardware devices and operating systems, application programs, and other hardware devices.

BACKGROUND OF THE INVENTION

Computer systems, such as smartphones, personal digital assistants, tablets, netbooks, laptops, and desktops, typically include a processor, communication unit such as a bus, power supply, and, optionally, a housing unit. Often, computer systems are configured to function with peripheral devices, which are termed "devices" for purposes of this application.

Certain devices are categorized by the position of each relative to a housing unit. Specifically, internal devices—called also "integrated devices"—generally are stored inside or integrated with the housing unit. Such integrated devices may include an internal hard drive, CD-R drive, CD-ROM drive, DVD-ROM drive, sound card, network card, video adapter, or an internal modem. External devices generally are stored outside of the housing unit and may include a printer, scanner, monitor, touchscreen, keyboard, or pointing devices such as a mouse, gaming controller, or joystick.

Devices may be categorized also by function. Specifically, storage devices may include an external hard drive, flash drive, disk drive, or any other device configured to permit information storage. Input devices may include keyboard, pointing devices such as a mouse, gaming controller, or joystick, digital camera, webcam, barcode reader, microphone, fingerprint scanner, or any other device configured to permit input of information into the computer. Output devices may include display devices such as a monitor, segment display such as a digital clock display, television set, or tactile electronic display, audio output devices such as speakers or headphones, printers, or any other device configured to permit information output from the computer.

An objective of many devices is to provide an output that is perceivable by a user. For purposes of this application, a "perceivable output" may include any perceptible output from the device including, for example, that which is viewable on a display, a touchable button, a light, or stored information. Other perceivable outputs may be input from one device—e.g., a keyboard or a mouse—and perceived as an output on a display device—such as a monitor or a touchscreen.

Computer systems can use hardware, software, or both to manage the resources of the computer system. Software used to manage a computer system's resources is termed an "operating system". When a user seeks to use a device with a computer system, the operating system may not have the information necessary to communicate with that device. Because of the plethora of devices available to connect with computer systems, it would be impractical to include the information necessary for communicating with every device in every operating system. Accordingly, a software program—called a "device driver" or "driver"—allows the device and operating system to communicate with each other. Generally, at least one driver is available for every type of device. At times, a driver may be developed for each of multiple operating systems (e.g., Microsoft Windows, Mac OS X, Android, Linux, BSD, etc.). When the driver permits communication between the operating system and a real device, the device can perform its function to generate a perceivable output.

Drivers also may be used to facilitate communication between the operating system and an application program. An application program—termed more simply an "app"—generally is configured to permit the user to perform a specific task. Popular apps may include word processing programs, image editing programs, game programs, database management programs, and document management programs. Certain apps may be configured for use specifically with a device. Such an app is termed a "device application program" for purposes of this application.

Conventionally, a driver or an app utilizing a device through the driver could not be developed until the real device, or at least a stable prototype of the real device, was completed. Clearly, such a delay in the development and validation of the driver further delays offering of the product for sale. At times, developers begin designing drivers based on predictions of the real device. For purposes of this application, the "real device" is the physical device as offered to consumers or other end-users. When the real device becomes available, draft versions of the driver often require substantial revisions, which results in a largely inefficient process.

To shorten the development cycle, systems have been built to enable earlier development of a driver. One such approach includes using an early prototype such as a Field-Programmable Gate Array ("FPGA prototype") for driver development. However, such prototypes can delay the start of driver development until the register transfer level ("RTL") design of the device is generally finished. Also, an FPGA prototype may differ significantly from the real device. As a result, the driver developed to work with that prototype may need significant revision in order that it can function with the real device.

In addition, known approaches for testing an FPGA prototype, or even the real device, during driver development permit only limited observation of the internal conditions of the prototype or device. Also, prototypes and real devices generally do not permit recording events that occurred, for example, before an error, and are difficult to control without a time-consuming and labor-intensive bootstrapping process.

Another approach to enable the development of a driver involves the utilization of virtual machines and virtual devices. A "virtual machine" is a software program configured to simulate the operation of certain hardware or operating system with minimal access to the actual hardware or operating system in the host computer system. In certain embodiments, a virtual machine is a simulated computer system operating within, but generally isolated from, a physical computer system. A "virtual device" is a software program configured to simulate the operation of or function as a real device without access to the real device or a prototype of the real device. Certain embodiments of a virtual device may be configured to have the same functional restrictions and other restrictions as real devices. A virtual device may be presented as a display that represents a real device.

Virtual devices may operate within an environmental infrastructure such as a virtual machine or an operating system. When functioning in a virtual machine, a guest operating system may interact with a virtual device as if it is a real device. This requires no change to the driver stack of the guest operating system. In contrast, when functioning in a non-virtual operating system, an operating system may be extended to allow loading of a virtual device as if it is a real device. This involves changing the driver stack of the operating system. An example of this approach is the Device Simulation Framework ("DSF"), which allows introduction of virtual devices that model and simulate Universal Serial Bus ("USB") devices in an operating system.

While certain virtual devices are known, such virtual devices have not been optimized for device simulation and driver development. Specifically, certain known virtual devices are too simple to permit development of a driver that consistently functions with the real device. Other known virtual devices are too complex to create an efficient simulation. For example, certain virtual devices permit observation, tracking, and control of the device, but often result in excess performance overhead and cause the simulation to operate slowly.

In addition, known virtual devices use concrete execution of software code. In other words, to achieve a certain task, a program may execute instructions that include one or more if-then statements (e.g., if A, then B; if not A, then C). In concrete execution, the developer must pre-determine which choice the program will make at each decision point. Accordingly, to simulate each real device behavior, a developer must explicitly specify concrete values and choices or supply run-time scripts for each device behavior. Such virtual devices render it difficult to conduct comprehensive exploration of possible device behaviors and simulation of the possible concurrency in device-driver interaction.

Other known device simulations are not configured to operate in virtual machine such as DSF and a Quick EMUlator ("QEMU") virtual machine. Such simulations include those generated from device designs at different stages within the development process, for example, transaction-level ("TL") designs in SystemC or SystemVerilog, register-transfer-level ("RTL") designs in Verilog or VHDL, and gate-level ("GL") designs as net-lists.

In addition, methods for preparing testing protocols for known virtual devices and the co-developed drivers typically must be generated manually or on a one-by-one basis, which is time-intensive and cost-prohibitive.

Clearly, there is a demand for a system and methods for constructing virtual devices that incorporate various levels of detail from a device design, developing a driver or application program with improved performance, and preparing automated testing protocols for validating a driver, driver-device combination, or application program, where such system and methods are configured to maximize the smooth integration of the resulting driver or application program with a real device. The present invention satisfies this demand.

SUMMARY OF THE INVENTION

Certain embodiments of the present invention are configured to create, deploy, analyze, and control a virtual device that may be used to generate a corresponding device driver or application program without access to a real device or real device prototype. Certain embodiments of the present invention include a symbolic virtual device, a hardware design-based virtual device, or a hardware design-based symbolic virtual device combination.

Certain embodiments of the present invention include what is termed a "symbolic virtual device" or "SVD" for purposes of this application. An SVD is a program configured to permit non-deterministic device behaviors and may be executed by a symbolic execution engine. A symbolic execution engine—also termed an "engine" for purposes of this application—which is described in more detail in another section of this application.

Possible inconsistencies between the SVDs and available hardware characteristics may be minimized by indirectly checking the conformance between SVDs and the available hardware designs. The design process for the hardware device and the development process of the device driver may be parallelized and synchronized even before hardware prototypes become available.

A device driver in an operating system may be configured to interact with an SVD as if it was a real device. Instead of a specific device behavior, the SVD may exhibit a permissible device behavior non-deterministically selected by the symbolic execution engine. The developer may control the SVD behavior by instructing the engine to yield control to the developer at certain decision points rather than making non-deterministic choices.

The present invention includes a system and methods that permit specifying a SVD, symbolically executing an SVD to interact with the driver with a permissible, but non-deterministic device behavior, setting up the driver development on an SVD, enabling developer-control over the SVD behavior, and determining the coverage statistics of a test suite over the driver and the SVD.

Certain embodiments of the present invention are configured to convert known hardware device designs to virtual devices. Such a virtual device will be termed "hardware design-based virtual devices" or "HD-VD" for purposes of this application. In addition to enabling device driver development and validation before real devices or their hardware prototypes become available, such embodiments facilitate creating virtual devices without requiring preparation of additional software programs to mimic the behaviors of these devices. Such embodiments leverage the hardware designs at different stages of the device development cycle and in different design languages, which the hardware designers typically create as a part of their development process. By utilizing hardware designs directly, embodiments of the present invention eliminate inconsistencies between the virtual devices and the real device.

The specification of an HD-VD may include definition of a virtual device stub interface so that the operating system recognizes the virtual device and specification of the conversion between the inputs/outputs through the stub virtual device interface and the inputs/outputs of the simulated design. With a HD-VD specification, the necessary software programs may be generated automatically to implement the convertor, connect the stub virtual device interface to the convertor, and connect the convertor to the interface of the hardware design through the facilities of the hardware simulators. Loading the HD-VD into the operating system entails loading the stub virtual device into the virtual device environment such as DSF and QEMU, loading the simulator that simulates the hardware design, and synchronizing the stub virtual device with the simulator in terms of inputs and outputs. Once the HD-VD is recognized by the operating system, the HD-VD is treated as if it was a real device. The development and validation of device driver may be conducted on top of the HD-VD the same way as the real device. In addition, all functionalities of the simulator may be utilized to monitor the simulated hardware design status (such as internal states), control its behaviors, and log its execution traces.

The present invention includes a system and methods that permit specifying an HD-VD, generating an HD-VD from its specification, loading a HD-VD into an operating system, and developing and validating the driver on a HD-VD.

Embodiments of the present invention include a system, which is termed a "virtual device management system" for purposes of this application. A virtual device management system may include a number of modules. A first module—termed an "infrastructure module" for this application—is configured to provide infrastructure to the other modules. A second module—termed a "virtual device module" for this application—is configured to simulate a hardware device. A third module—termed a "support module" is configured to provide support functions such as generating test cases and reports and offering management options to the other modules.

Embodiments of the infrastructure module include an operating system and a virtual machine, and may also include an application program. The operating system may include or may be configured to communicate with a device driver. The virtual machine may include a virtual device stub component, which is configured to appear to the virtual machine as if it is the virtual device. The virtual device stub component also may be configured to send and receive information such as input/output requests to and from a virtual machine interface in the virtual device module.

Embodiments of a virtual device module include a virtual device, virtual machine interface, and a symbolic execution engine. The virtual machine interface is a program configured to send and receive information to and from a virtual device stub component in the infrastructure module.

The symbolic execution engine is configured to permit symbolic execution of program instructions and generate constraints that exactly describe the set of values possible on a given path through the program. In symbolic instructions, variables are represented as symbolic expressions instead of concrete values. Accordingly, the outputs computed by the program are expressed as a function of input symbolic values. The symbolic state of a program includes the symbolic values of program variables, a path condition, and a program counter. The path condition may be expressed as a Boolean formula over the symbolic inputs, which accumulates constraints that the inputs must satisfy for the symbolic execution to follow the particular associated path. The program counter points to the next statement to be executed.

Symbolic execution extends conventional virtual devices in several ways. First, environmental inputs to the virtual devices may be symbolic values. Second, non-deterministic choices are allowed at decision points. Third, symbolic execution can be used to statically analyze virtual devices. Static analysis permits analyzing the device without actually executing all of the underlying software code.

Embodiments of the support module may include components such as a management component, test case generator, bug report generator, and a coverage report generator. A management component may be configured to test, control, and communicate with an application program, virtual device, and driver. A test case generator may automatically generate test cases that involve testing the virtual device, driver, application program, or a combination to achieve user-selected test criteria. If, during testing, a bug or error is detected, a bug report generator may prepare a report describing the bug or error. A coverage report generator may prepare a report describing the functions of the virtual device, driver, or app.

It is an object of embodiments of the present invention to create and test device drivers using a system and methods that can be implemented without a real device or a prototype of a real device.

It is another object of embodiments of the present invention to permit transaction-level modeling in virtual devices.

It is another object of embodiments of the present invention to permit non-deterministic modeling in virtual devices.

It is another object of embodiments of the present invention to improve coverage of concurrent behaviors of devices and drivers while preserving design model simplicity and execution efficiency of virtual devices.

It is another object of embodiments of the present invention to permit fully automated deployment of a virtual device.

It is another object of embodiments of the present invention to permit partially automated deployment of a virtual device.

It is another object of embodiments of the present invention to use virtual devices to automatically generate test cases to achieve specified coverage goals.

It is an additional object of embodiments of the present invention to create symbolically executable virtual devices.

It is an additional object of embodiments of the present invention to load an SVD into an operating system or virtual machine so that it is recognized as a real device.

It is an additional advantage of the present invention to control and trace the simulation of an SVD.

It is another object of embodiments of the present invention to evaluate test coverage on a driver and SVD.

It is another object of embodiments of the present invention to convert hardware device designs into virtual devices for device driver development and validation.

It is another object of embodiments of the present invention to load an HD-VD into an operating system or virtual machine so that they are recognized as if they are real devices.

It is another object of embodiments of the present invention to control and trace the simulation of a HD-VD.

It is another object of embodiments of the present invention to evaluate test coverage on a driver and HD-VD by a test suite.

The present invention and its attributes and advantages will be further understood and appreciated with reference to the detailed description below of presently contemplated embodiments, taken in conjunction with the accompanying drawings.

BRIEF DESCRIPTION OF THE DRAWINGS

The preferred embodiments of the invention will be described in conjunction with the appended drawings provided to illustrate and not to limit the invention, where like designations denote like elements, and in which:

FIG. 10 illustrates an embodiment of an exemplary computer system.

DETAILED DESCRIPTION OF PREFERRED EMBODIMENTS

Figure 1B:
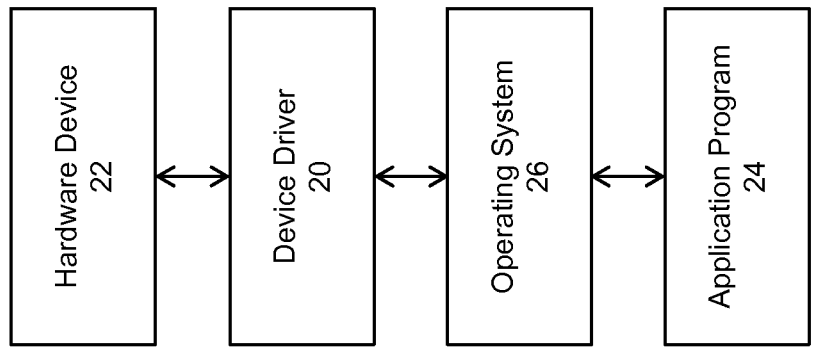
FIG. 1B is a block diagram of an embodiment of a system including device driver configured to facilitate communication between a hardware device, an application program, and operating system.
Figure 1A:
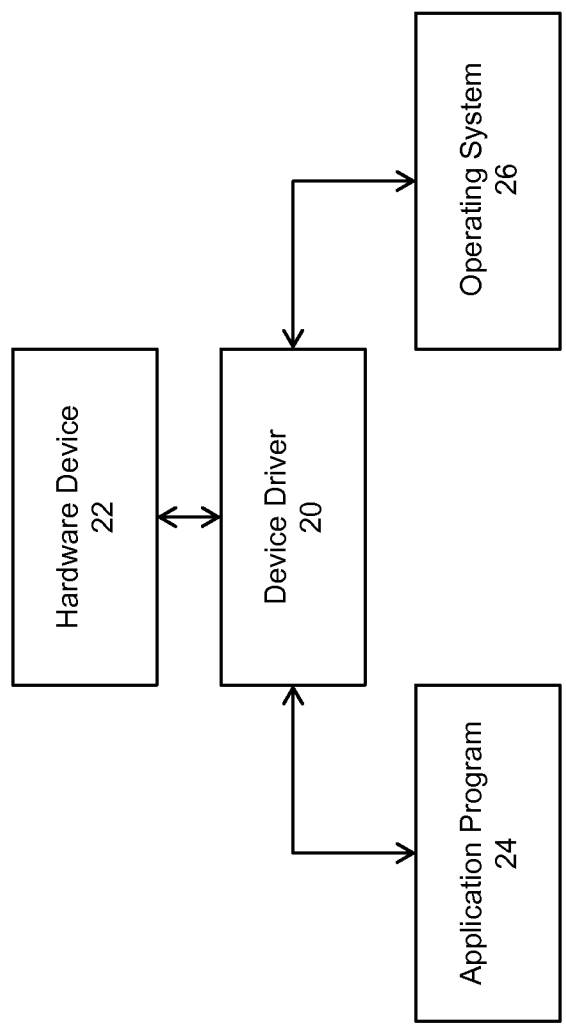
FIG. 1A is a block diagram of an exemplary embodiment of a system including device driver configured to facilitate communication between a hardware device, an application program, and operating system.

Embodiments of the present invention are configured to permit development and validation of a device driver without having the real device or its prototype available. As illustrated in FIG. 1A, a device driver 20 facilitates communication between a hardware device 22 and application program 24 or an operating system 26. In certain embodiments, as illustrated in FIG. 1B, the device driver 20 facilitates indirect communication between the hardware device 20 and the application program 24—that is, through the operating system 24. In other embodiments, the hardware device 22 communicates directly with the application program 24 or operating system 26.

A device driver 20 simplifies programming by acting as translator between the hardware device 22 and the application program 24 or the operating system 26. Typically, a device driver 20 communicates with a hardware device 22 through a computer bus or communications link and with the application program 24 or the operating system 26 through system calls. When the application program 24 or the operating system 26 invokes a routine in the driver 20, the driver 20 issues commands to the hardware device 22. Once the hardware device 22 sends data back to the device driver 20, the device driver 20 may invoke routines in the application program 24 or the operating system 26. The driver 20 is illustrated with broken lines in various Figures since various drafts of the driver may be developed throughout the implementation of the system and methods.

Certain components of the system 10 of the present invention may form modules, as illustrated in FIGS. 3A, 3B, 4, 5, and 6. An infrastructure module 30 is configured to provide computer infrastructure to the other modules. A virtual device module 40 is configured to simulate a hardware device. A support module 50 is configured to provide support functions such as generating test cases and reports and providing management options to the other modules.

Embodiments of the infrastructure module 30 include a program environment such as an operating system 26 and/or a virtual machine 28. Certain embodiments also include an application program 24. The operating system 26 may include or may be configured to communicate with a device driver 20 developed through certain methods of the present invention or other methods. A virtual machine 28 may include a virtual device stub component 32, which is configured to appear to the virtual machine 28 as if it is the virtual device 42. The virtual device stub component 32 also may be configured to facilitate communication with the actual virtual device 42 such as by sending and receiving information such as input/output requests to and from a virtual machine interface 46 in the virtual device module 40.

Embodiments of a virtual device module 40 include a virtual device 42, virtual machine interface 46, and a symbolic execution engine 44. The virtual machine interface 46 is a program configured to facilitate communication with the environment such as by sending and receiving information to and from a virtual device stub component 32 in the infrastructure module 30.

The symbolic execution engine 44 is configured to permit symbolic execution of virtual device program code and generate constraints that exactly describe the set of values possible on a given path through the program. In symbolic instructions, variables are represented as symbolic expressions instead of concrete values. Accordingly, the outputs computed by the program are expressed as a function of input symbolic values. The symbolic state of a program includes the symbolic values of program variables, a path condition, and a program counter. The path condition is a Boolean formula over the symbolic inputs, which accumulates constraints which the inputs must satisfy for the symbolic execution to follow the particular associated path. The program counter points to the next statement to be executed.

Embodiments of the support module 50 may include components such as a management component 52, test case generator 53, bug report generator 54, and a coverage report generator 56. A management component 52 may be configured to test, control, and communicate with an application program, virtual device, and driver. A test case generator 53 may automatically generate test cases that involve the virtual device, driver, and application program to achieve user-selected test criteria. If, during testing, a bug or error is detected, a bug report generator 54 will prepare a report describing the bug or error. A coverage report generator 56 is configured to prepare a report describing the functions and status of the virtual device, driver, or application program. Based on the coverage report, the test case generator 53 may generate additional test cases that can potentially improve the current coverage.

Embodiments of the present invention may be configured to use characteristics of virtual devices to improve symbolic execution effectiveness, generate test cases characterizing paths through virtual devices and drivers, and provide facilities to replaying those paths with the generated test cases.

As described above, embodiments of the present invention may include a virtual device 42, which may include a symbolic virtual device or a hardware device design-based virtual device. Embodiments of a symbolic virtual device are configured to permit non-deterministic device behaviors. In other words, instructions for implementing the device include code with decision points for two or more choices. When the system reaches that decision point, the decision is made according to certain guidelines. Advantageously, such instructions are easier and faster to develop since the developer can provide general guidelines instead of mapping every choice at every decision point.

Program instructions for an SVD may be non-deterministic in terms of both concurrency and environment inputs. Concurrency is a property of a system in which several programs are executing simultaneously and potentially interacting with each other by, for example, sharing certain resources. Environmental inputs may include information received from other system components (e.g., an operating system, application program, or device) and such inputs may be symbolic values and are not limited to concrete values.

Figure 2A:
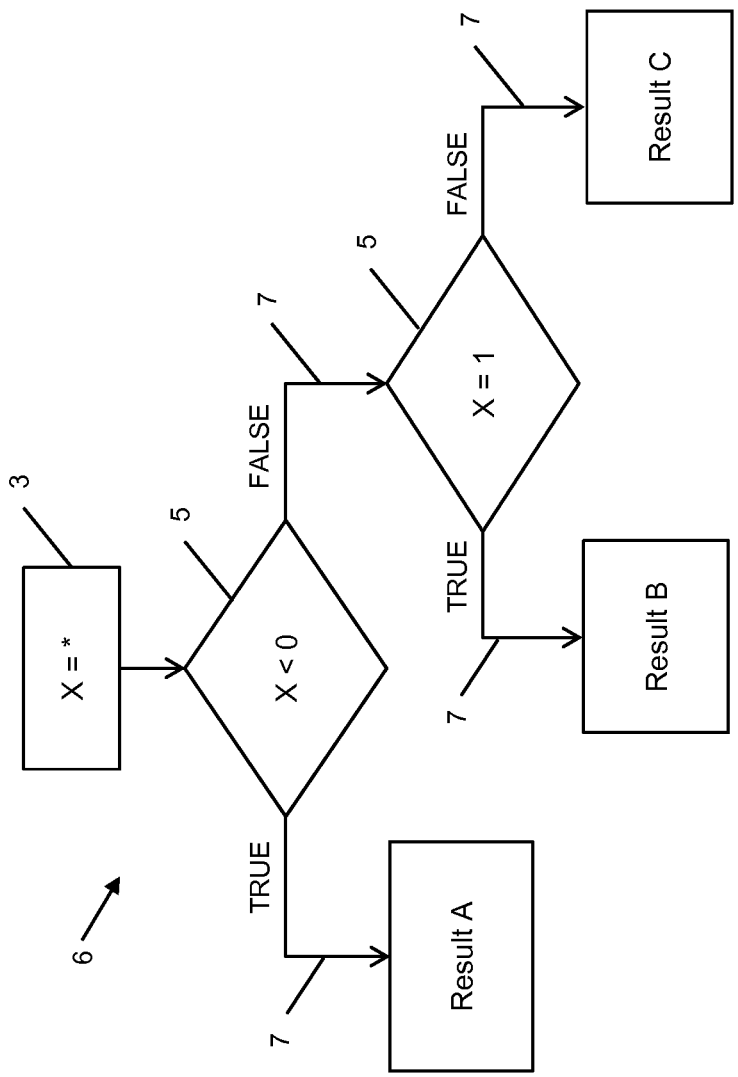
FIG. 2A illustrates an exemplary symbolic execution tree.
Figure 2B:
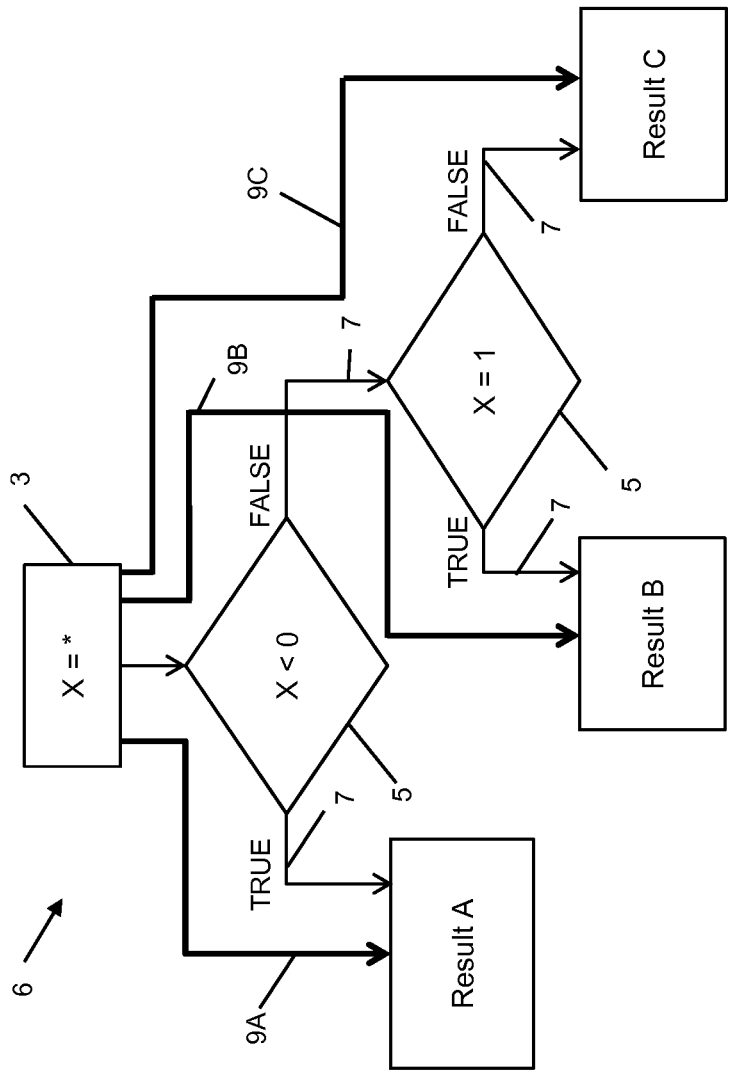
FIG. 2B illustrates a symbolic execution tree and various paths.
Figure 3A:
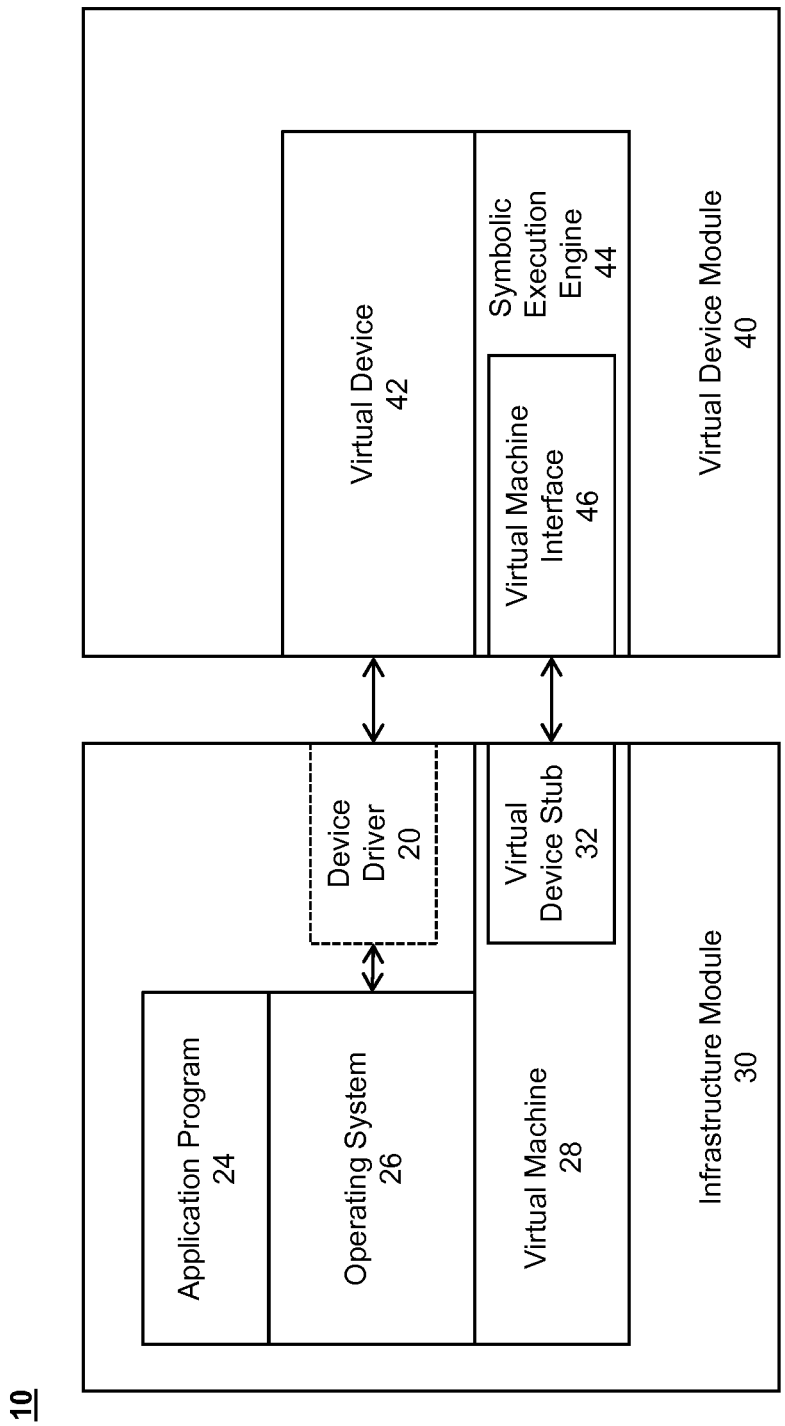
FIG. 3A illustrates an embodiment of a system according to the present invention including an infrastructure module and a virtual device module.
Figure 3B:
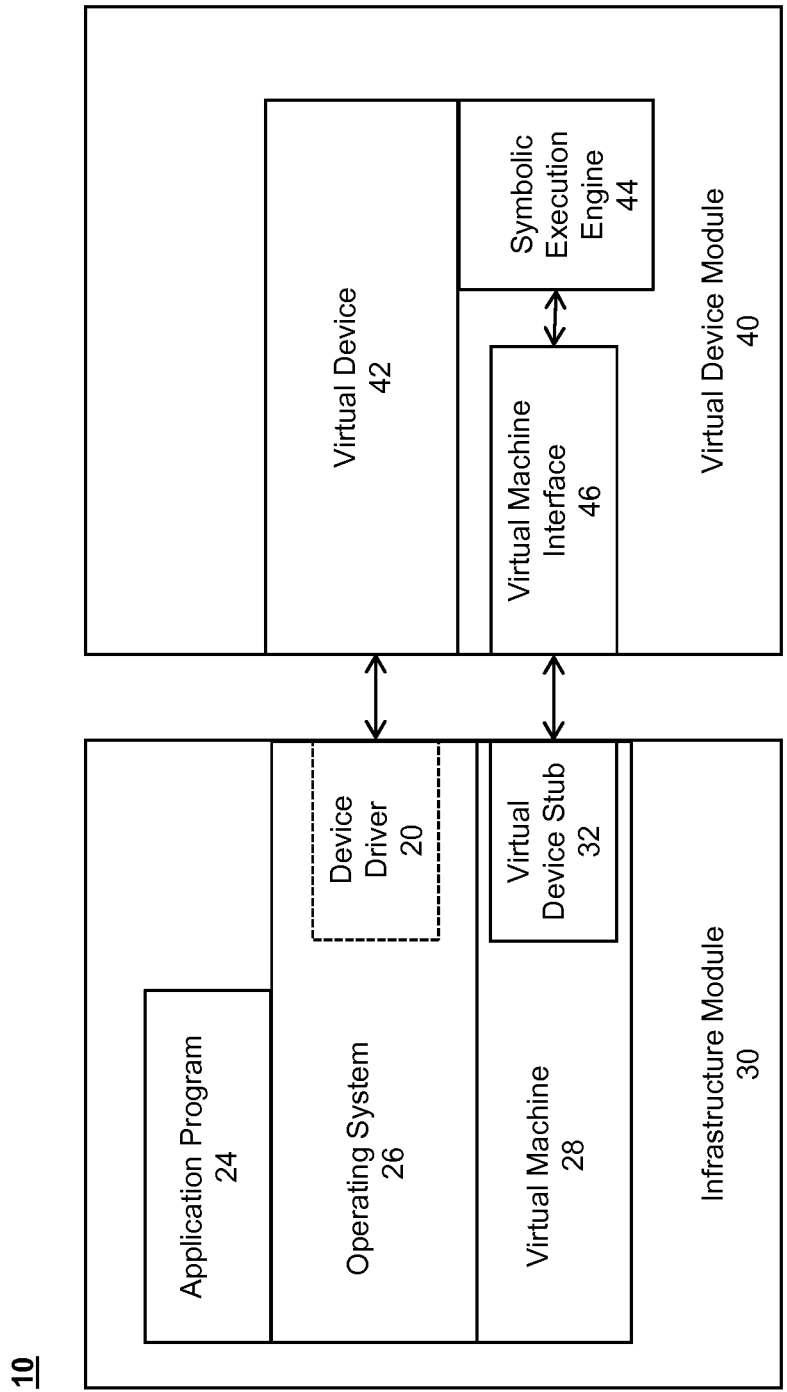
FIG. 3B illustrates an embodiment of a system according to the present invention including an infrastructure module and a virtual device module.
Figure 4:
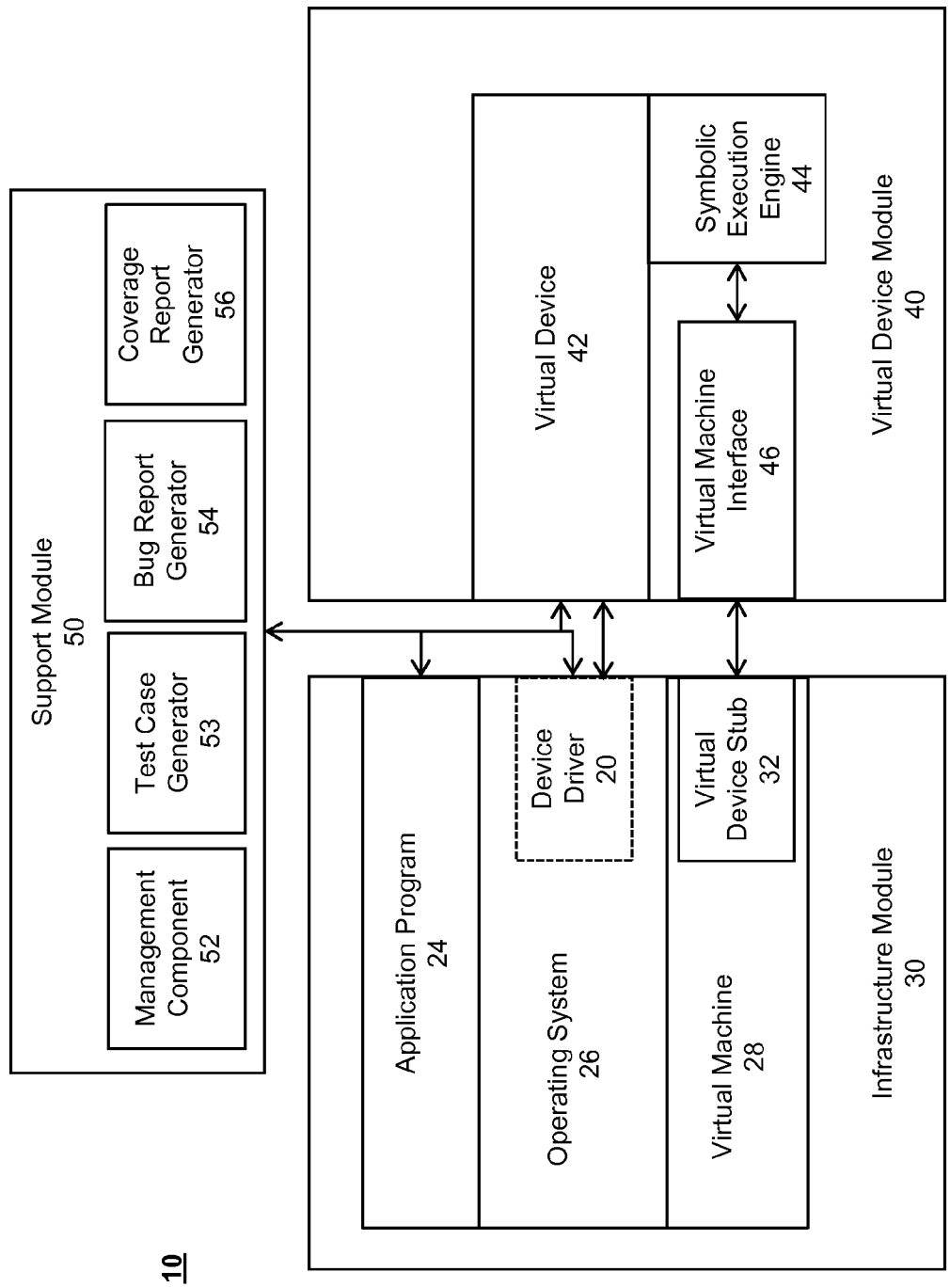
FIG. 4 illustrates an embodiment of a system according to the present invention, including an infrastructure module, a virtual device module, and a support module.

Certain embodiments permit analysis of every possible path through the one or more decision points in a program code. As illustrated in FIG. 2A and FIG. 2B, a symbolic execution tree 6 can be used to illustrate the possible paths explored by the symbolic execution of a program, such as the code identified below.

```
int f(int x)
{
    if(x<0)
        return -x;
    if (x == 1)                                    (1)
        return 2;
    return x;
}
```

In FIG. 2A, the decision point nodes 5 represent the symbolic program states and the arcs 8 represent the state transitions. At the input 3, the variable X has a symbolic value, i.e., any value allowed by its type (in this case, an integer). At each decision point node 5, the condition is recorded, and a series of conditions may be accumulated. The condition or series of conditions under which each path is implemented are generally termed the "path condition".

In the embodiment illustrated in FIG. 2B, there are three possible paths, and accordingly, three path conditions. The path condition for a first path 9A is an input X less than zero. The path condition for a second path 9B is an input X greater than zero and input X is equal to 1. The path condition for third path 9C is an input X greater than zero and input X is not equal to 1. The path condition may be expressed as a Boolean formula for the symbolic inputs. Each path ends at a different result (e.g., result A, result B, result C). A result may be an instruction to return to a specific point in the code (e.g., "return -x", "return 2", "return x"), perform a new action, or end a process. In certain embodiments, the path may reach an error or a "bug" before reaching a result.

Embodiments of the present invention may include a symbolic execution engine to execute an SVD. Embodiments of an engine may be configured to generate test inputs. Generally, instead of running program code on manually-generated or randomly-generated inputs, engines run the SVD code using a symbolic input initially allowed to be "anything". An engine may replace program inputs with symbolic values and concrete operations with symbolic operations. When the program reaches a decision point node based on a symbolic value, the engine conceptually follows both options. When a path reaches a result, a test case can be generated by solving the current path condition for concrete values. When the concrete values are used as the input, the same path will be followed, which permits identification, and possibly repairing, of the bug.

Embodiments of an engine may be configured to minimize or eliminate the challenges with exponential path possibilities that may limit ability to thoroughly test software programs. One or more constraints may be applied when executing the virtual device. One constraint may include a loop bound to each loop whose loop condition is a symbolic expression. With the loop bounds, the user controls the depth of each loop explored. Loop bounds may be added manually for embodiments having only a few loops or automatically for embodiments having many loops. Another constraint may be time. A time boundary may be added to require termination of the symbolic execution in a given amount of time. If the symbolic execution does not completely finish within the given time boundary, there may be unfinished paths. For such paths, test cases for the incomplete path conditions may still be generated. Also the loop and time boundaries may be implemented in the same embodiment. The loop and time boundaries may be implemented to manage memory usage.

Embodiments of an engine may be configured to generate reports including tracing information. However, certain reporting methods may result in traces covering the same statements. An example program follows.

```
int f (int x)
{
    if ( x == 1 || x == 2)
        return 0;
    return 1;
}                                                  (2)
```

The program (2) results in two paths.

$$\text{Path 1:} x==1 \| x==2. \tag{3}$$

$$\text{Path 2:} x \neq 1 \& \& x \neq 2. \tag{4}$$

However, a program executed with an engine, such as KLEE, may be compiled to an intermediate representation, such as LLVM bitcode. The compiler may decompose the "if" conditional expression into two separate branches. KLEE operates on LLVM bitcode and finds three traces based on the LLVM bitcode. Each resulting path constraint is as follows:

$$\text{Path 1:} x==1. \tag{5}$$

$$\text{Path 2:} x==2. \tag{6}$$

$$\text{Path 3:} x \neq 1 \& \& \ x \neq 2. \tag{7}$$

Clearly, the path 1 and 2 are very similar and will typically cover the same sequence of code statements. To avoid duplicative traces in the report, certain embodiments are configured to detect and eliminate duplicative traces. For example, a method of generating a report without duplicative traces may include the steps of running virtual device with symbolic value; generating test cases including a concrete value for all explored paths; and then, for each test case, running virtual device with concrete value; obtaining path trace; if path trace covering the same sequence of C code statement exists, save path information in an extended analysis report, and if path trace covering the same sequence of statement does not exist, then save path information in both extended and simplified analysis report.

Certain embodiments of a virtual device may receive requests to implement outside functions from its environment. Such outside functions may be implemented using a function call for a subroutine. If a function call does not affect the variable in the virtual device, the symbolic engine may be configured to respond by displaying a warning message and not taking other action in response to the call. If the function call may affect the value of the variables in the virtual devices, the function may be implemented in a stub.

Certain embodiments of the present invention are configured not only to find the paths using the symbolic engine and generate test cases, but also to run the concrete test cases as generated. Such embodiments may include steps such as initializing a stack, loading a test case, assigning the test case to the corresponding variables of a device model. If there is no user input, the system remains inactive for a period of time.

Upon receiving a user input such as a switch, the test case moves forward by executing one instruction and displaying the variable changes and the current state is pushed into the stack. After a break, the test case moves backward by popping one state off the stack and setting the state as current state. After a break, to inspect the variable, the variable is searched in the current state and the value of the variable is returned. After a break, the system finishes the run and returns to another code set.

Certain embodiments are configured to permit a developer to interrupt or change the path while running the concrete test cases to permit further exploration of what inputs and initial states are used to trigger the path and inspect values of variables at any step. This method can be easily applied to many types of device models of virtual devices, minimizes overhead, and provides a user-friendly interface. Certain embodiments of the method may require a small harness for each virtual device and a common stub for each category of devices.

Certain embodiments of an engine are capable of executing only one programming language or many programming languages. Embodiments of an SVD specification may be configured to be compatible with a specific engine and may include only one programming language, certain language features, or many languages. The engine symbolically executes the SVD wherein the environmental inputs are provided as symbolic values rather than concrete values. Additionally, the engine symbolically executes the SVD at decision points wherein the decision is selected non-deterministically from all the possible choices.

Embodiments of an engine may include various constraint solvers such as an STP constraint solver.

Embodiments of an SVD may operate in a number of modes. In a debugging mode, an SVD may be executed symbolically. As the SVD responds to an input/output request, the engine 44 computes the feasible SVD execution paths at the current device state. The feasible paths may be provided directly to the user to make a choice or the choice is made by a pre-set strategies. This mode is designed for step-by-step debugging and provides the user complete control over the SVD. The debugging mode also may be configured to permit in-situ path prediction and randomized execution of the SVD.

In a profiling mode, an SVD may be executed concretely by the virtual machine and symbolically by the symbolic section engine, sometimes, simultaneously. Symbolic execution exhaustively explores all possible execution paths through the SVD. The concrete execution paths of the SVD resulted from a test case are compared against the symbolic paths to calculate the coverage report 56 for the test case. In this mode, the symbolic paths can be pre-generated by the symbolic engine to improve the run-time profiling efficiency.

Upon executing test cases, the symbolic execution engine 44 may provide the coverage statistics such as statement coverage, branch coverage, path coverage, and transaction coverage information. Transaction coverage information may include identification of some or all possible transactions of an SVD resulting from an environmental input or a driver command. Transaction coverage information also may include an assessment of the impact of a test case or test suite in terms of which transactions or paths have been hit and how often each were hit. Additional metrics specific to devices may also be utilized that considers one or more driver commands and environmental inputs. After the execution statistics such as percentiles for the coverage metrics are collected, they may be visualized graphically as bar charts, pie charts, or other diagrams.

If an engine is not compatible with an SVD or an engine is intended to be used with a number of SVDs, an adapter may be created for each SVD or a group of SVDs. Such an adapter is termed a "harness" for purposes of this application. In certain embodiments, a harness and an SVD pair may form a stand-alone program. Embodiments of a harness may include a virtual machine including a guest operating system; however, other simpler embodiments are contemplated as well. Generally, a harness is configured to handle non-deterministic entry function calls and symbolic inputs to device models.

A harness may be generated using manual harness generation or automatic harness generation.

Manual harness generation involves examining how a virtual machine invokes the virtual device, which virtual machine APIs are invoked by a virtual device, and what these APIs invoke recursively. The implementation of the invoked functions is included in the harness. At times, it may be necessary to make a function produce non-deterministic outputs by throwing away its implementation.

Manual harness generation may be useful to generate a harness configured to function with a category of devices. Certain devices are categorized based on functionality, such as network adapters and massive storage devices, or based on an interface type, such as Peripheral Component Interconnect ("PCI") and Universal Serial Bus ("USB"). Such devices in a category may be standardized according to a known standard.

A harness may be generated automatically by implementing an algorithm that includes a number of steps. First, a call graph—that is a graph displaying the invocation relationships between various subroutines—originating from a virtual device is analyzed to determine which functions were invoked by the virtual device and how often those functions were invoked. Then, based on the frequency of use, certain functions are selected for incorporation into the harness code. It is often sufficient to include the implementations of the first level functions invoked. This algorithm also includes a refinement loop which adjusts based on the symbolic execution, for instance, if making a function non-deterministic leads to a large number of paths, the implementation of this function may need to be included.

Embodiments of a harness, which may be generated manually or automatically, may include a number of components, including declarations of state variables and parameters of entry functions, code for making state variables and inputs of entry functions symbolic, non-deterministic calls to virtual device entry functions, and stub functions for virtual machine API functions invoked by virtual devices.

Regarding the declarations of state variables and parameters of entry functions, a virtual device is not a stand-alone program, and accordingly, the state variables and function parameters must be defined. If a virtual device is running in a virtual machine, it will register its entry functions with the virtual machine. Moreover, the virtual machine will help the virtual device manage its state variables. Every time an entry function is invoked, the state variables and necessary parameters of the function will be transferred to the function from the virtual machine. Other declarations define necessary parameters for the entry functions.

Regarding code for making state variables and inputs of entry functions symbolic, this permits covering as many paths as possible. The inputs of an entry function should contain state variables and necessary parameters. Certain embodiments implement a specific function "svd_make_symbolic" in the engine to initialize the inputs symbolically. All state variables and parameters of entry functions may be made symbolic before they are used.

Regarding non-deterministic calls to virtual device entry functions, virtual devices provide all kinds of entry functions for communicating with the operating system or virtual machine. To analyze a virtual device, all entry functions are executed with symbolic inputs. A symbolic variable is defined in the harness to make nondeterministic calls to all entry functions. Certain functions may be invoked by a driver to write to or read from the device registers. Additional functions may be invoked by the operating system or virtual machine to notify the device about events from outside environments, such as whether there is a physical link to the device and whether there is a new packet to receive.

Regarding stub functions for virtual machine API functions invoked by virtual devices, certain stub functions for selected functionalities are known in the art. Such stub functions may be included in a harness according to desired or necessary functionalities.

In certain embodiments, the SVD may be loaded into an operating system or may be included in a virtual machine in the same manner as a conventional virtual device. In such embodiments, the interface of the SVD to the operating system or virtual machine may mimic a conventional virtual device interface. However, the internal mechanism for loading an SVD is executed by a symbolic execution engine. The execution of SVD may include two parts: the symbolic execution of its device model and the virtual device interface that connects its device model to the operating system or virtual machine. As the SVD is loaded, both the symbolic device model and the virtual device interface are executed. When the SVD is initialized, for each variable in the device model, a concrete value is assigned if such a value is known; otherwise a symbolic value is assigned.

With SVD loaded in the environment, the developer may execute the device driver in the operating system—the host operating system or a guest operating system on the virtual machine—to interact with the SVD as if it was a real device. As the SVD receives a command from the driver, it executes the device model symbolically in response to the command. The engine may introduce environment inputs non-deterministically to permit exploration of concurrent execution of device model and device driver. Inputs may be assigned symbolic values so that many concrete input scenarios are explored by the execution. When multiple execution paths are feasible, one path is selected non-deterministically. Instead of a specific device behavior, the SVD exhibits a permissible device behavior non-deterministically selected.

Certain embodiments of the present invention permit a developer to control the behavior of the SVD so that its execution is not completely non-deterministic. The developer may control the SVD behavior by instructing the engine to yield control to the developer at certain decision points rather than making non-deterministic choices. The developer may also control the SVD behavior by assigning different weights to different choices at certain decision point so that the symbolic engine makes its choice according to the weights.

Figure 5:
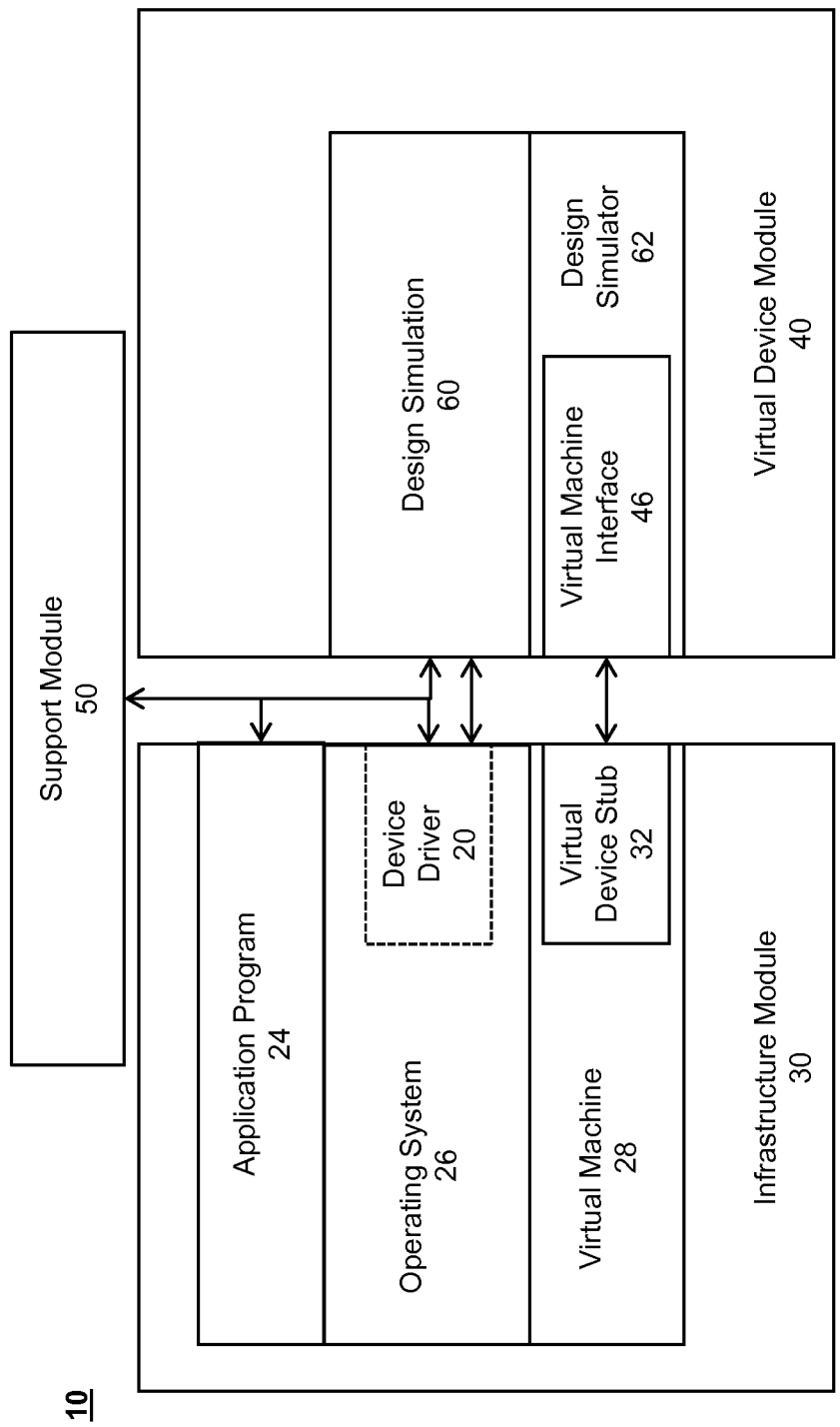
FIG. 5 illustrates an embodiment of a system according to the present invention including an infrastructure module, a virtual device module having a design simulator, and a support module.

Certain embodiments of the present invention include a hardware device design-based virtual device as illustrated in FIG. 5. The simulation of a hardware design 60 such as an RTL model, is incorporated into a virtual machine as a virtual device. A device design may be simulated by a design simulator 62 such as a standalone hardware simulator, or a design-specific simulation library. The simulation may be configured to communicate with the virtual machine 28 through a virtual device stub component 32. Inputs/outputs may be converted through the virtual device stub interface to the inputs/outputs of the simulated design. The virtual device stub is defined to follow the requirements of the virtual machine and the interface protocols of the anticipated device such as PCI and USB. Virtual device inputs/outputs are often defined as software function calls while inputs/outputs to hardware designs vary depending on the hardware design languages used. For example, for RTL designs the inputs/outputs are defined as signals coming in and going out of a hardware module and for SystemC design, the inputs/outputs are defined as function calls, but in different formats from the virtual device function calls. Accordingly, the convertor specification includes inputs/outputs to the virtual device, inputs/outputs to the hardware design, and rules for converting between them.

Figure 6:
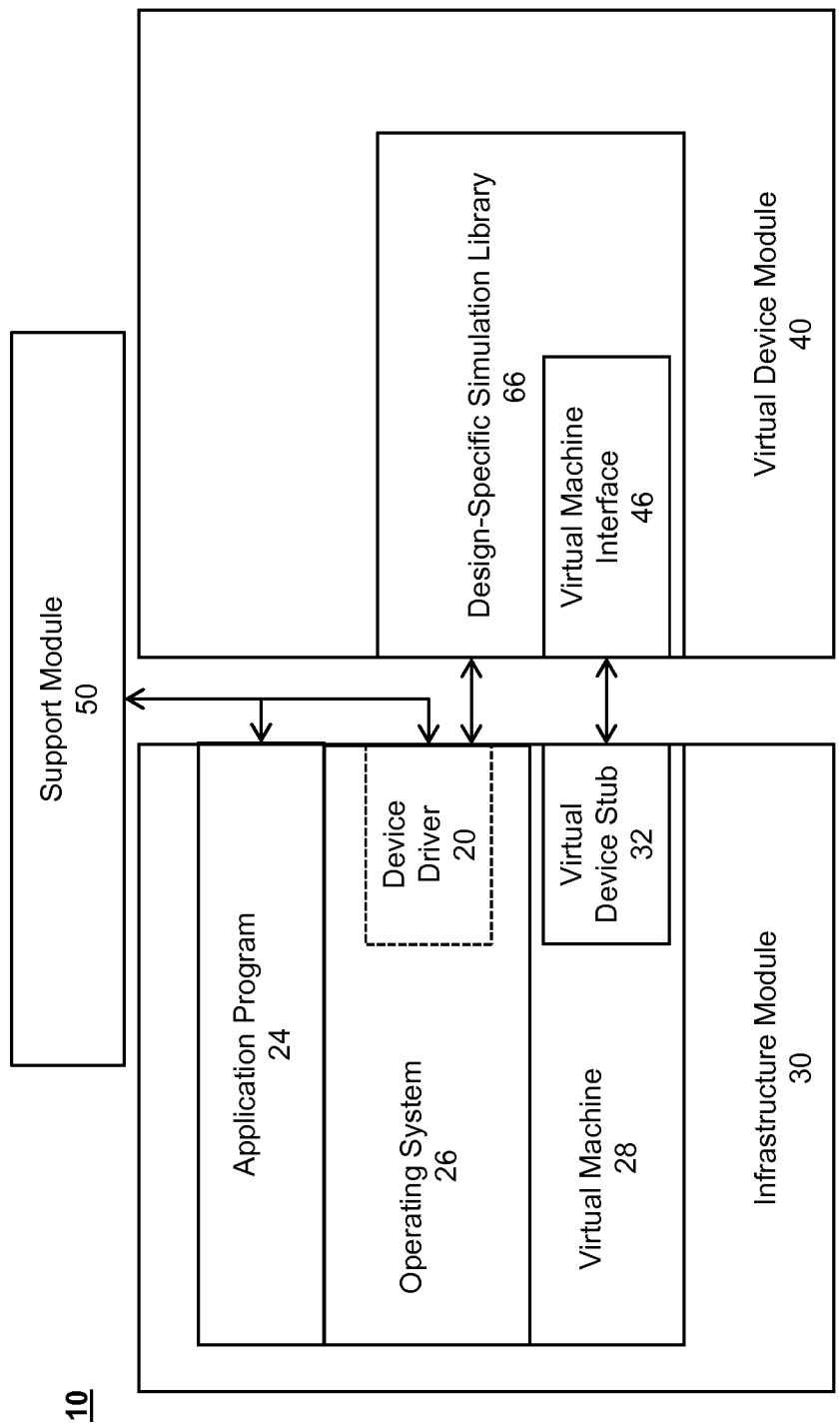
FIG. 6 illustrates an embodiment of a system according to the present invention including an infrastructure module, a virtual device module having a design-based virtual device, and a support module.

The hardware design is compiled into a design-specific virtual device 66 such as a C/C++ module and the module is packaged as a virtual device and loaded into the virtual machine module 40, as illustrated in FIG. 6.

Once the HD-VD is specified, the necessary software programs are automatically generated that implement the convertor, connect the virtual device stub interface to the convertor, and connect the convertor to the interface of the hardware design through the facilities of the simulators 62. For a simulator 62 such as Mentor Graphics ModelSim which operates as a standalone system, the convertor is split into two parts: the virtual device side and the simulator side. Each side of the convertor is implemented as a dynamically linked library, loaded by the virtual device environment and the hardware simulator respectively. The two libraries communicate with each other at run time to realize the input/output conversion.

The virtual device side library captures the input function calls to the virtual device and communicates the type of calls and the parameters to the simulator side library, which then generates the input signals/function calls to the hardware design accordingly. The simulator side library captures the output signals/function calls from the hardware design and communicates the types of signals and their values or the types of function calls and their parameters to the virtual device side library, which then invokes the corresponding virtual device output function calls with the properly formulated parameters. For a hardware simulator such as Verilator which compiles the hardware design into a software program that may be utilized as a library, the convertor is combined with the simulation program to create a dynamically linked library. This library is loaded by the virtual device environment. As the stub virtual device receives a virtual device input, a corresponding function of the convertor is called and the parameters of the virtual device input are passed onto the convertor. In this convertor function, those parameters are analyzed and the proper sequence of functions in the simulator program is called with the properly formulated parameters. When the simulator program is ready to output, it invokes a function in the convertor which transforms the output from the simulated design into the invocation to the corresponding virtual device output functions.

The HD-VD is loaded into an operating system or a virtual machine. For a standalone simulator such as ModelSim, the simulator is first started and the hardware design loaded. As it starts, the simulator side library is loaded. Then, the virtual device stub is loaded by the virtual device environment. As the virtual device stub is loaded, the library is also loaded. As the library is loaded, it synchronizes with the simulator side library. Once these libraries are synchronized and the virtual device stub recognized by the operating system or the virtual machine, the loading of HD-VD is complete and ready to be utilized by the device driver. In this setup, the virtual device environment and the simulator are two separate processes and they communicate through inter-process communication. For a simulator generated as a library, as the virtual device stub is loaded by the virtual device environment, the dynamically linked library is also loaded with the virtual device stub. Once the virtual device stub is recognized by the operating system, the loading of HD-VD is complete and ready to be utilized by the device driver. In the setup, the simulator is part of the virtual device environment and often executed in a thread.

Once the HD-VD is recognized by the operating system or virtual machine, it is treated as if it was a real device. The development and validation of device driver may be conducted on top of the HD-VD the same way as the real device. Since the HD-VD is the simulated hardware design, as the device driver interacts with it, all functionalities of the simulator may be utilized to monitor its status (such as internal states), control its behaviors, and log its execution traces.

Embodiments of the present invention include an integrated development environment configured to provide automation through the lifecycle of SVDs including creation, analysis, deployment, run-time control, and testing. Such an integrated development environment is configured to provide a number of functions automatically. For example, it may permit: (1) creation, compilation, and debugging of SVDs, (2) SVD transaction analysis: enumerating possible types of transactions through SVDs, (3) push-a-button deployment of SVDs into virtual machines, (4) run-time control of SVDs: breakpoint, step-through, in-situ path prediction, and randomized execution, (5) incorporation of HD-VD into SVD, and (6) SVD test coverage report and automatic test generation.

Figure 7:
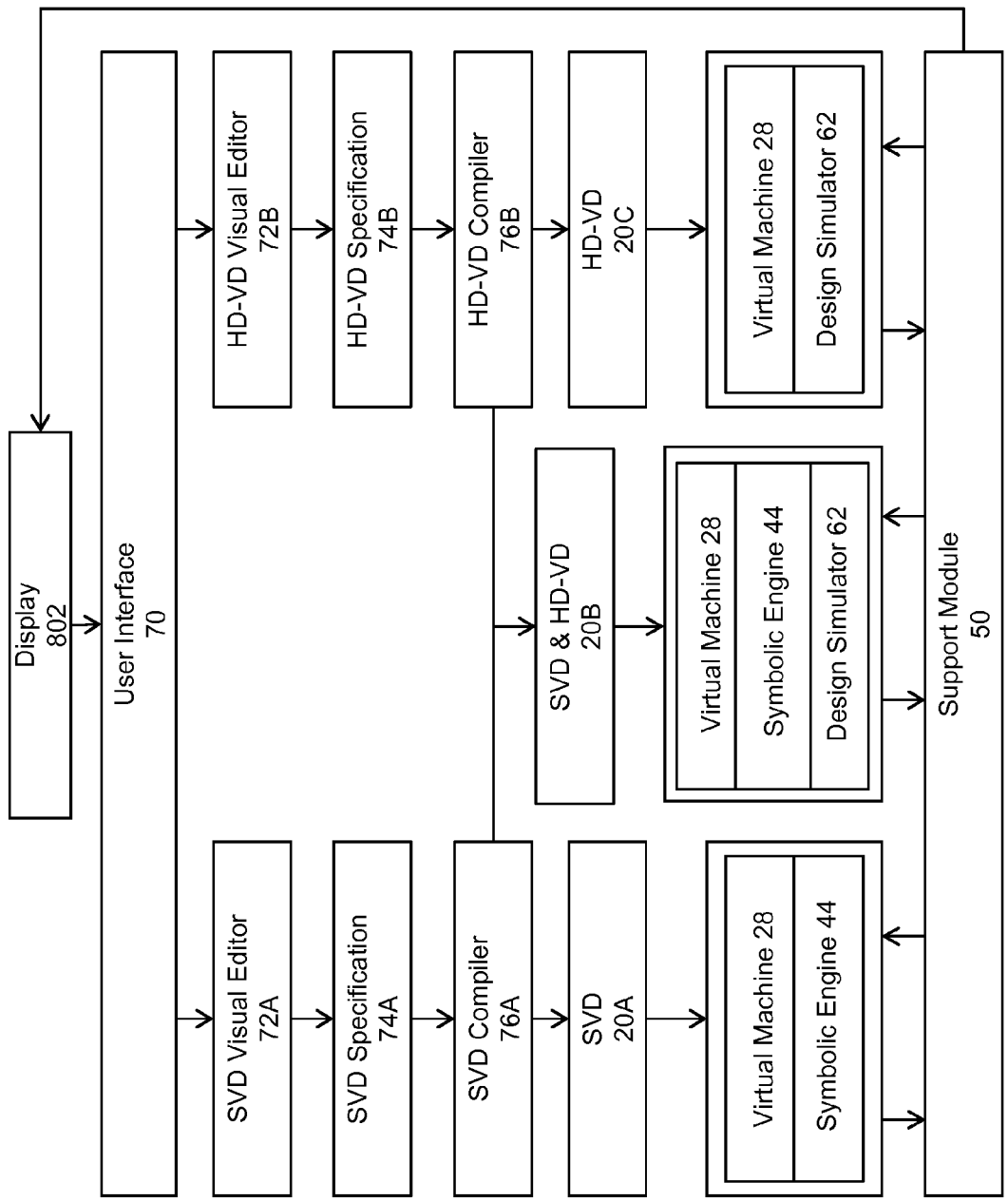
FIG. 7 illustrates a flowchart of an integrated development environment.

An embodiment of an integrated development environment including three workflows (i.e., SVD workflow, HD-VD workflow, and SVD+HD-VD workflow) is illustrated in FIG. 7. All the three workflows can be initiated from a user interface 70 such as a VD Studio graphical user interface. A user interface 70 may be viewed on an input/output display interface 802. In certain embodiments, a user interface 70 is used to invoke a visual editor 72 for each corresponding workflow, namely SVD visual editor 72A and/or HD-VD visual editor 72B. The user may create and configure SVD and HD-VD through the visual editor 72 to create an SVD specification 74A or an HD-VD specification. Once the SVD specification 74A and/or HD-VD specification 74B is completed, it is compiled into a SVD 20A and/or HD-VD 20B automatically using a compiler 76A, 76b. The SVD 20A and HD-VD 20B are then deployed into an environment such as a virtual machine 28 or operating system 26, or an embodiment of a virtual device module 40 that may include a symbolic engine 44 and/or a hardware simulator 62. As the simulators execute, the SVD 20A and HD-VD 20B traces are captured and send to the bug report and coverage report generator in the support module 50. Test cases can also be generated and provided to the simulators to apply.

Certain embodiments of the present invention are configured to permit using virtual devices to develop a driver for future use with a real device such as a silicon device. However, virtual devices may behave differently from silicon devices due to design and implementation errors, misunderstanding of design specifications, and even the different level of details. It is beneficial to assess the conformance of a silicon device with its virtual device and discover the inconsistencies.

Figure 8:
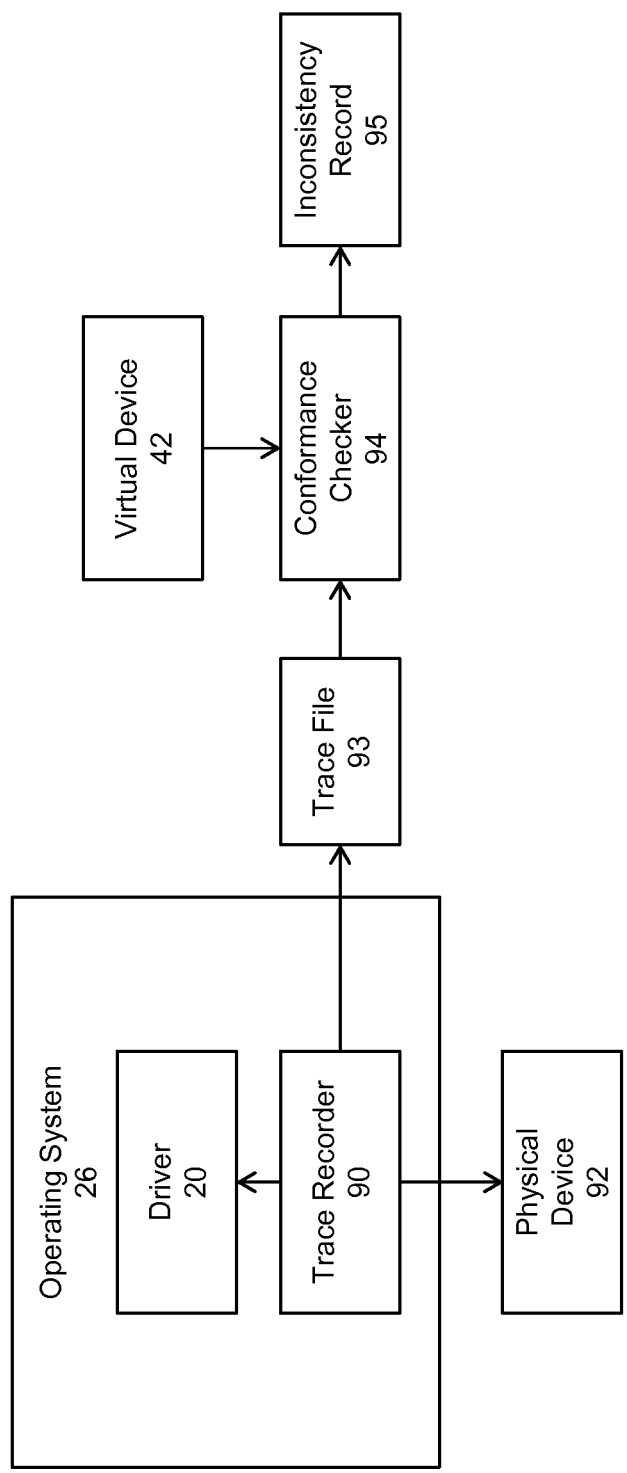
FIG. 8 illustrates an embodiment of the present invention that implements a trace recorder and conformance checker.

Accordingly, certain embodiments of the present invention permit a post-silicon conformance assessment of a hardware device with its corresponding virtual device and localizing the inconsistencies, as illustrated in FIG. 8. Such an embodiment permits symbolic execution of a virtual device with the same driver request sequence to its silicon device, and assesses whether the silicon device and virtual device behave consistently. More specifically, the driver requests sent to the silicon device are recorded, the virtual device is symbolically executed by taking the recorded request sequence, and the observable states of the virtual device and silicon device are analyzed for inconsistencies.

Embodiments that implement this post-silicon conformance assessment overcome the limited observability of silicon devices. A silicon device has internal states which are difficult to observe. Moreover, the outside environment inputs of the silicon device are also difficult to capture. However, when this embodiment replays the silicon device state transitions on the virtual device, it models the internal states and outside environment inputs using variables with symbolic values. In this way, symbolic execution covers their possible values.

Embodiments that implement a post-silicon conformance assessment overcome the complexity of symbolic execution. The complexity of symbolic execution is high, as it suffers from the path explosion problem. The high complexity often incurs excessive overheads, in terms of time costs and memory usages. In order to reduce these overheads, an optimization, adaptive concretization may be used to eliminate unnecessary symbolic variables, a major factor contributing to the symbolic execution complexity.

Embodiments that implement this post-silicon conformance assessment may include a trace recorder 90 and a conformance checker 94, as illustrated in FIG. 8. A trace recorder 90 is configured to record the driver request sequence to the silicon device 92 and the silicon device interface state before each driver request is issued. The trace recorder 90 produces a trace file 93 that includes the driver request sequence and the interface states, together forming a device trace or an observable device transition history.

In certain embodiments, a trace recorder 90 records every driver request. In other embodiments, the trace recorder selectively records certain requests. The interface registers accessed during symbolic execution of the virtual device and the registers that the users want to compare with the virtual device are captured. The relevant registers may be extracted manually or automatically, such as by static analysis. Also, a developer may designate certain registers that they wish to compare. In such embodiments, the silicon device state is a partial state.

A conformance checker 94 executes the virtual device with the recorded driver request sequence from the trace file 93, checks if the silicon device 92 and the virtual device 42 are consistent, and outputs an inconsistency record 95 if inconsistencies are found.

The conformance checking method may include initializing the virtual device state by assigning the observable state of the silicon device before the virtual device takes the first driver request. Then, the virtual device is symbolically executed upon a driver request from the device trace. The consistency between the virtual device and the silicon device is assessed, after the virtual device consumes the driver request. If there is an inconsistency, it is recorded and the virtual device with the silicon device are synchronized by setting the silicon device state as the virtual device state; otherwise, synchronize the virtual device by further constraining the virtual device states with the corresponding register values in the silicon device state. Then the checker takes the next driver request and repeats the executing, checking, and recording steps. The conformance checking process terminates when it completes a trace file, i.e., finishes the last driver request in the sequence.

The conformance checker 94 may include a state checker component, which takes a partial state and a set of symbolic states of the virtual device as inputs. The partial state is a symbolic state that can be viewed as a set of concrete states.

It contains all the possible silicon device states. For each symbolic state of the virtual device, it contains a set of possible virtual device states. An inconsistency is discovered if there is no intersection between the partial state and any symbolic state of the virtual device.

An equation that may be implemented in the state checker component includes a partial state, P, and the set of symbolic states of the virtual device, G. G contains several symbolic states, $S_1, S_2, \ldots, S_m$. For each $S_i \in G$, $0 < i \leq m$, we compute $P \cap S_i$. If for all $S_i \in G$, $P \cap S_i = \emptyset$, an inconsistency is discovered.

In order to compute $P \cap S_i$, we construct the expressions of P and $S_i$. Assuming that the device state has the following variables: $var_1, var_2, \ldots, var_n$, we define the values of the state variables of P as $Val(var_1)_P, Val(var_2)_P, \ldots Val(var_n)_P$.

We construct the expression of P as Expr (P): $(var_1 == Val(var_1)_P) \wedge (var_2 == Val(var_2)_P) \wedge \ldots \wedge (var_n == Val(var_n)_P)$.

Similarly, assuming that the constraints of $S_i$ is expressed as $Cont(S_i)$, the expression of $S_i$, $Expr(S_i)$, is as follows: $(var_1 == Val(var_1)_{Si}) \wedge (var_1 == Val(var_2)_{Si}) \wedge \ldots \wedge (var_1 == Val(var_n)_{Si}) \wedge Cont(S_i)$.

By constructing the expressions of P and $S_i$, testing if $P \cap S_i$ is non-empty becomes testing if Expr (P) ∧ Expr($S_i$) may be satisfied. Algorithm 1 below implements this process.

---

Algorithm 1.
Algorithm 1 State_Checking(P,G)

1: NextState = NULL
2: FLAG = FALSE
3: Expr(P) = TRUE
4: for all $var_i$ of P do
5:     Expr(P) = Expr(P) ∧ ($var_i$ == Val($var_i$)$_P$)
6: end for
7: for all $S_i \in$ G do
8:     Expr($S_i$) = 1
9:     for all $var_i$ of $S_i$ do
10:       Expr($S_i$) = Expr($S_i$) ∧ ($var_i$ == Val($var_i$)$_{Si}$)
11:     end for
12:     Expr($S_i$) = Expr($S_i$) ∧ Cont($S_i$)
13:     if Expr($S_i$) ∧ Expr(P) is satisfied then
14:       NextState = NextState ∪($S_i \cap$ P)
15:       FLAG = TRUE
16:     end if
17: end for
18: return FLAG

---

Suppose a device state contains two variables, "a" and "b". In the partial state P, there is only one variable "a" which has the concrete value of 3. The symbolic value β may represent the variable "b". In the set of symbolic states of the virtual device, there may be a symbolic state S {a==α, b==β', α<=5, β'<10}. The expression of the state P, Expr(P) is a==3)∧ b==β).

The expression of S, Expr(S) is (a==α)∧ (b==β')∧ (α<=5)∧ (β'<10).

Since the expression Expr(P)∧ Expr(S) may be satisfied, $P \cap S \neq \emptyset$. The silicon device state and the virtual device state are considered consistent.

In the synchronization steps, the silicon device state is set as the virtual device state. Otherwise, the new virtual device state is a union of all non-empty intersection of P and $S_i$, since this union contains the possible virtual states consistent with the silicon device state.

As described above, certain embodiments of the present invention include a harness. A harness may be used in association with the conformance checking process as well. Non-deterministic choices are used to enable non-determinism in virtual devices such as QEMU virtual devices. Some input variables of the virtual device have unknown values. For example, outside environment inputs of the virtual device are unknown, as they are not captured from the silicon device. These variables are initialized with symbolic values, so that symbolic execution can cover the possible inputs from the outside environment. Capturing the hardware concurrency requires non-deterministic executions of a loop where the module functions are invoked non-deterministically. Such a loop is defined as the main loop of an execution harness. Theoretically, symbolic execution needs to execute the loop until all states are explored. However, this is not realistic for some embodiments, as fix-point computation in symbolic execution is expensive.

In certain embodiments, symbolically executing a module function of a virtual device often has the same effect or a similar effect on the device state as executing it only once. For example, receiving a packet and receiving multiple packets usually lead to the same effect on the device registers: an interrupt is fired by setting one bit in the interrupt register. Therefore, to efficiently capture the concurrency of module functions, the loop boundary may be set equal to the number of the module functions in the execution harness. This implementation of non-deterministic interleaving will cover most of the device concurrency. Nevertheless, it is possible to have false negatives, as a boundary for the main loop may be set instead of non-deterministic many executions.

False negatives may result in certain embodiments because the non-deterministic interleaving by executing the main loop of the execution harness is bounded to a fixed number of times or because symbolic execution executes a loop in the virtual device that is not statically bounded a fixed number of times. However, such false negatives are typically low because the loops in the virtual device and the main loop in the execution harness are bound to reflect silicon device usage and accordingly cover most of the virtual device behaviors.

A conformance checking embodiment may be implemented as a kernel library such as a Linux kernel library. Linux device drivers always call kernel API functions to manipulate devices, for example, a driver calls function "writel" to write a long integer to a device register. We instrument the source code of these kernel functions so that the trace recorder is invoked to record the driver requests once the driver calls these functions to manipulate the device.

A conformance checking embodiment also may include a symbolic execution engine such as KLEE to symbolically execute the virtual device. Before execution, a compiler such as an llvm-gcc compiler is used to translate the virtual device into an intermediate representation such as LLVM bitcode. An engine such as KLEE may be modified for state checking. The engine also may be modified to remove certain functions not used in certain embodiments, for example, generating test cases.

To minimize execution overhead and otherwise optimize symbolic execution, an optimization, adaptive concretization may be used to eliminate unnecessary symbolic variables. One approach is to concretize the virtual device to reduce the number of the explored paths. The virtual device state consistent with the silicon device state is usually produced by an execution trace which accesses none of the symbolic variables, or only a small number of symbolic variables, i.e., the values of the symbolic variables do not affect the conformance checking results most of the time. Therefore, the symbolic symbols can be adaptively, even aggressively concretized with few false negatives introduced.

Figure 9:
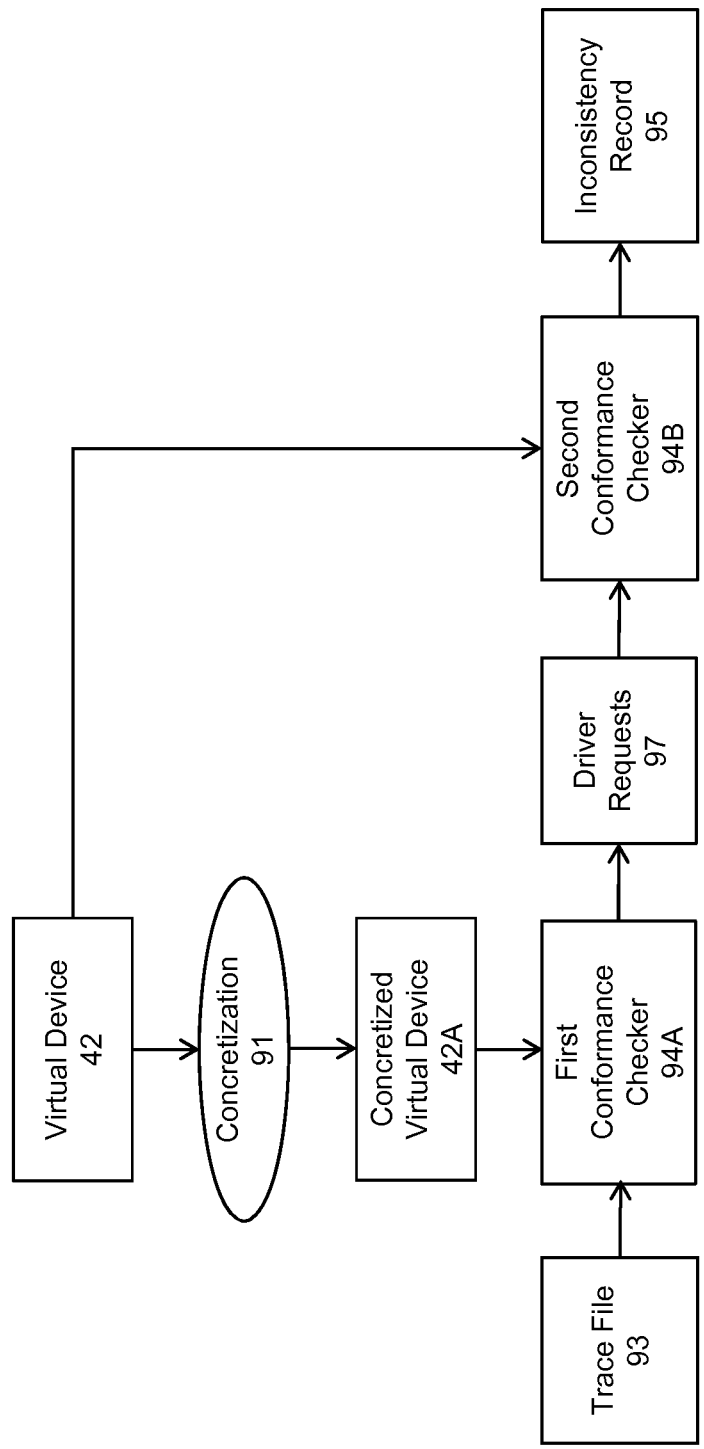
FIG. 9 illustrates an embodiment of the present invention including a flowchart for adaptive concretization.

As illustrated in FIG. 9, a virtual device may be concretized 91 by directly assigning concrete, random values to all the symbolic variables. A conformance checker utilizes a similar method to that illustrated in FIG. 8 to conduct conformance checking, albeit taking the concretized virtual device 42A instead of the general virtual device 42. A first conformance checker 94A records all the driver requests 97 leading to inconsistencies during conformance checking. The conformance checking is conducted a second round, using the original virtual device 42 and a second conformance checker 94B this time. Moreover, the conformance checker 94 only works on the driver requests recorded in the first round. The inconsistencies discovered in this round are reported as inconsistencies between the virtual device and the silicon device. The inconsistencies may be reported as virtual device bugs or silicon device bugs.

In this approach, the two-rounds of conformance checking are termed a "concretizing mode" and "symbolic mode" respectively. By using adaptive concretization, enumerating unnecessary states is avoided. This can reduce symbolic execution overheads significantly.

In embodiments in which the virtual device is concretized using adaptive concretization, a state checking algorithm of the concretizing mode may be simplified. The state checker in the concretizing mode essentially checks concrete states that do not have any variables with symbolic values and any symbolic constraints. For this reason, the state checker does not need to either construct symbolic expressions for each state, or invoke the solver to solve constraints. Instead, it checks if the observable register values of the silicon device are equal to the corresponding ones of the virtual device. An "InterfaceRegisters" is a set of interface registers variables located in the range of selective capturing. This algorithm is more efficient since it only works on variables with concrete values and avoids solving symbolic expressions.

FIG. 10 illustrates an exemplary computer system 80 that may be used to implement the system and methods according to the invention. One or more computer systems 80 may carry out the methods presented herein as computer code.

Computer system 80 includes an input/output display interface 802 connected to communication unit 804—such as a bus—, which forwards data such as graphics, text, and information, from the communication unit 804 or from a frame buffer (not shown) to other components of the computer system 80. The input/output display interface 802 may be, for example, a keyboard, touch screen, joystick, trackball, mouse, monitor, speaker, printer, any other computer peripheral device, or any combination thereof, capable of entering and/or viewing data.

A computer system 80 includes one or more processors 806, which may be a special purpose or a general-purpose digital signal processor that processes certain information. Computer system 80 also may include a main memory 808, for example, random access memory ("RAM"), read-only memory ("ROM"), mass storage device, or any combination thereof. Embodiments of a computer system 80 may also include a secondary memory 810 such as a hard disk unit 812, a removable storage unit 814, or any combination thereof. Computer system 80 may also include a communication interface 816, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 808, secondary memory 810, communication interface 816, or a combination thereof, function as a computer usable storage medium, otherwise referred to as a computer readable storage medium, to store and/or access computer software including computer instructions. For example, computer programs or other instructions may be loaded into the computer system 80 such as through a removable storage device, for example, a floppy disk, ZIP disks, magnetic tape, portable flash drive, optical disk such as a CD or DVD or Blu-ray, Micro-Electro-Mechanical Systems ("MEMS"), nanotechnological apparatus. Specifically, computer software including computer instructions may be transferred from the removable storage unit 814 or hard disc unit 812 to the secondary memory 810 or through the communication unit 804 to the main memory 808 of the computer system 80.

Communication interface 816 allows software, instructions and data to be transferred between the computer system 80 and external devices or external networks. Software, instructions, and/or data transferred by the communication interface 816 are typically in the form of signals that may be electronic, electromagnetic, optical or other signals capable of being sent and received by the communication interface 816. Signals may be sent and received using wire or cable, fiber optics, a phone line, a cellular phone link, a Radio Frequency ("RF") link, wireless link, or other communication channels.

Computer programs, when executed, enable the computer system 80, particularly the processor 806, to implement the methods of the invention according to computer software including instructions.

The computer system 80 described herein may perform any one of, or any combination of, the steps of any of the methods presented herein. It is also contemplated that the methods according to the invention may be performed automatically, or may be invoked by some form of manual intervention.

The computer system 80 of FIG. 10 is provided only for purposes of illustration, such that the invention is not limited to this specific embodiment. It is appreciated that a person skilled in the relevant art knows how to program and implement the invention using any computer system.

The computer system 80 may be a handheld device and include any small-sized computer device including, for example, a personal digital assistant ("PDA"), smart handheld computing device, cellular telephone, or a laptop or netbook computer, hand held console or MP3 player, tablet, or similar hand held computer device, such as an iPad®, iPad Touch® or iPhone®.

While the foregoing written description of the invention enables one of ordinary skill to make and use what is considered presently to be the best mode thereof, those of ordinary skill will understand and appreciate the existence of variations, combinations, and equivalents of the specific embodiments, and examples herein. The invention should therefore not be limited by the above described embodiments and examples, but by all embodiments within the scope and spirit of the invention.

What is claimed is:

1. A system for generating a virtual device to develop a device driver, comprising:
   a host computer system including at least a processor, main memory, and a communication unit;
   an infrastructure module including an environmental infrastructure in which another program can operate and a virtual device stub configured to permit communication between the infrastructure module and a symbolic execution engine through use of a virtual machine interface;
   a virtual device module including a virtual device configured to function as a real device without access to the real device, the symbolic execution engine configured to execute symbolically the virtual device, and the virtual machine interface configured to permit communication between the infrastructure module and the symbolic execution engine through use of the virtual device stub;

a device driver, developed based on communication between the infrastructure module and the symbolic execution engine, configured to facilitate communication between the virtual device or the real device and the environmental infrastructure such that the virtual device or the real device is able to process information to produce a perceivable output.

2. The system of claim 1 in which the environmental infrastructure is a virtual machine.

3. The system of claim 1 in which the environmental infrastructure is an operating system.

4. The system of claim 1 in which the virtual device module incorporates a design simulator configured to execute a design simulation or a design-specific simulation library generated from a device design.

5. The system of claim 1 in which the device driver is also configured to facilitate communication between the virtual device or the real device and a device application program.

6. A system for using a virtual device to develop a device driver, comprising:

a host computer system including at least a processor, main memory, and a communication unit;

an infrastructure module including an environmental infrastructure in which another program can operate and a virtual device stub configured to permit communication between the infrastructure module and a virtual device module through use of a virtual machine interface;

the virtual device module including a virtual device configured to function as a real device without access to the real device, a design simulator configured to execute a design simulation or a design-specific simulation library generated from a device design, and the virtual machine interface configured to permit communication between the infrastructure module and the virtual device module through use of the virtual device stub;

a device driver, developed based on communication between the infrastructure module and the virtual device module, configured to facilitate communication between the virtual device or the real device and the environmental infrastructure such that the virtual device or the real device is able to process information to produce a perceivable output.

7. The system of claim 6 in which the device driver is also configured to facilitate communication between the virtual device or the real device and a device application program.

8. A computer-implemented method for developing a device driver or a device application program, comprising:

constructing, by a computer system, a virtual device configured to be executed symbolically by the computer system, the virtual device configured to function as a real device;

using, by the computer system, a symbolic execution engine configured to execute a virtual device symbolically, wherein the symbolic execution engine includes a virtual machine interface configured to communicate with a virtual device stub;

providing, by the computer system, a virtual machine configured to simulate operation of certain hardware or operating system of the computer system, wherein the virtual machine includes the virtual device stub configured to communicate with the virtual machine interface; and developing, by the computer system, a device driver configured to facilitate communication between the real device or the virtual device and an environmental infrastructure of the computer system, such that the virtual device or the real device is able to process information to produce a perceivable output.

9. The method of claim 8 in which said constructing includes utilizing non-deterministic transaction-level modeling.

10. The method of claim 8 in which said constructing incorporates a design simulator configured to execute a design simulation or a design-specific simulation library generated from a device design.

11. The method of claim 10 further including:

defining, by the computer system, a virtual device stub interface configured to permit recognition of the virtual device by the virtual machine; and converting, with a convertor of the computer system, inputs and outputs to be readable by the design simulator and the virtual machine, wherein the converter is implemented as a dynamically linked library and is loaded into the virtual machine and the design simulator.

12. The method of claim 8 in which the virtual device is configured to operate in a profiling mode in which the virtual device is simultaneously executed in a concrete manner in the virtual machine and in a symbolic mode by the symbolic execution engine.

13. The method of claim 8 in which the virtual device is configured to operate in a debugging mode in which the virtual device is executed symbolically by the symbolic execution engine, and in which all feasible execution paths of execution are identified and displayed in a display device.

14. The method of claim 8 in which the symbolic execution engine includes a loop boundary configured to limit repetition of a loop having a symbolic loop condition to a certain number of iterations.

15. The method of claim 8 in which the symbolic execution engine includes a time limit such that the symbolic execution engine terminates execution at the end of the time limit whether or not each path of virtual device has been symbolically executed.

16. The method of claim 8, further comprising:

generating automatically, by the computer system, one or more test cases that include concrete values for program variables;

running, by the computer system, a test by incorporating the concrete values into code for the virtual device, driver, or device application program;

outputting a report that shows results of the test including information regarding at least one of statement coverage, branch coverage, or transaction coverage of the code.

17. The method of claim 8, further comprising verifying a device driver with a real device with test cases generated by the virtual device.

18. The method of claim 8, further including:

preparing, by the computer system, a harness configured to permit the symbolic execution engine to execute the virtual device, wherein the harness includes at least first level functions invoked by the virtual device.

19. The method of claim 8, further comprising:

assessing conformance of the virtual device with a real device by:

employing a trace recorder of the computer system, the trace recorder configured to record a sequence of driver requests sent to the real device and a sequence of real device interface states before each driver request is issued, applying a conformance checker of the computer system, the conformance checker configured to execute the virtual device with the sequence of driver requests from the trace recorder, comparing, by the computer system, results from a trace of the real device and the virtual device, and delivering, by the computer system, an output report regarding the outcome of said comparing, the report including information regarding identified inconsistencies or lack of identified inconsistencies.

20. The method of claim 19, further comprising:

concretizing a virtual device to reduce explored paths, by:
  directly assigning concrete, random values to symbolic variables in the virtual device, by the computer system, to produce a concretized virtual device;
  completing said employing and said applying with the concretized virtual device to generate results regarding the concretized virtual device;
  performing said employing and said applying with a non-concretized virtual device to generate results regarding the non-concretized virtual device, particularly for inconsistencies identified with the concretized virtual device; and
  ascertaining differences, by the computer system, between the results regarding the concretized virtual device and results regarding the non-concretized virtual device.

* * * * *